(12) United States Patent
Yasuda et al.

(10) Patent No.: US 10,144,486 B2
(45) Date of Patent: Dec. 4, 2018

(54) SNOWMOBILE

(71) Applicant: YAMAHA HATSUDOKI KABUSHIKI KAISHA, Iwata-shi, Shizuoka (JP)

(72) Inventors: Atsushi Yasuda, Shizuoka (JP); Kotaro Ogura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 282 days.

(21) Appl. No.: 14/842,859

(22) Filed: Sep. 2, 2015

(65) Prior Publication Data

US 2016/0068227 A1 Mar. 10, 2016

(30) Foreign Application Priority Data

Sep. 8, 2014 (JP) .................. 2014-181983

(51) Int. Cl.
*B62M 27/02* (2006.01)

(52) U.S. Cl.
CPC ....... *B62M 27/02* (2013.01); *B62M 2027/023* (2013.01); *B62M 2027/028* (2013.01)

(58) Field of Classification Search
CPC ................ B60K 11/02; B62M 27/02
See application file for complete search history.

(56) References Cited

U.S. PATENT DOCUMENTS

| | | | | |
|---|---|---|---|---|
| 3,871,460 A * | 3/1975 | Dehnert | ................. | B62M 27/02 180/182 |
| 3,901,335 A * | 8/1975 | Johnson | ................. | B60K 11/02 180/182 |
| 4,008,777 A * | 2/1977 | Juto | ................. | B62M 27/02 180/182 |
| 4,893,692 A * | 1/1990 | Smith | ................. | B62M 27/02 180/190 |
| 5,129,473 A * | 7/1992 | Boyer | ................. | B60K 11/02 180/68.1 |
| 5,660,245 A * | 8/1997 | Marier | ................. | B62M 27/02 180/190 |
| 5,957,230 A * | 9/1999 | Harano | ................. | B60K 11/04 123/41.51 |
| 7,188,693 B2 * | 3/2007 | Girouard | ................. | B62J 35/00 180/182 |
| 9,327,789 B1 * | 5/2016 | Vezina | ................. | B62K 5/10 |
| 2002/0029920 A1 * | 3/2002 | Fournier | ................. | B60K 5/12 180/300 |
| 2003/0029663 A1 * | 2/2003 | Etou | ................. | B62M 27/02 180/312 |
| 2003/0150658 A1 * | 8/2003 | Nakano | ................. | B62M 27/02 180/190 |

(Continued)

FOREIGN PATENT DOCUMENTS

DE  42 24 120 A1  1/1994

*Primary Examiner* — Joseph M Rocca
*Assistant Examiner* — Daniel S Yeagley
(74) *Attorney, Agent, or Firm* — Keating and Bennett, LLP

(57) ABSTRACT

A snowmobile includes an engine including a crankshaft, a driving shaft rotatable together with the crankshaft, an endless track belt drivable by the driving shaft, and a vehicle body frame including a wall portion defining an engine room accommodating the engine and engine support portions and supporting the engine. At least a portion of the wall portion is made of a carbon fiber-reinforced plastic material and overlaps the engine as seen in a side view.

15 Claims, 28 Drawing Sheets

(56) References Cited

U.S. PATENT DOCUMENTS

| | | | |
|---|---|---|---|
| 2006/0162976 A1* | 7/2006 | Desmarais | B62M 27/02 |
| | | | 180/190 |
| 2008/0179461 A1* | 7/2008 | Roming | B29D 99/0003 |
| | | | 244/129.6 |
| 2011/0094814 A1* | 4/2011 | Nagao | B62M 27/02 |
| | | | 180/190 |
| 2011/0192667 A1 | 8/2011 | Conn et al. | |
| 2011/0240398 A1* | 10/2011 | Vezina | B62M 27/02 |
| | | | 180/312 |
| 2013/0032417 A1* | 2/2013 | Sampson | B62M 27/02 |
| | | | 180/182 |
| 2013/0032418 A1 | 2/2013 | Ripley et al. | |
| 2015/0158532 A1* | 6/2015 | Ayuzawa | B62D 25/2009 |
| | | | 296/193.07 |
| 2016/0144930 A1* | 5/2016 | Nasca | B62M 27/02 |
| | | | 180/182 |

\* cited by examiner

SNOWMOBILE

The present application claims priority to Japanese Patent Application No. 2014-181983 filed on Sep. 8, 2014, which is incorporated by reference herein in its entirety.

BACKGROUND OF THE INVENTION

1. Field of the Invention

The present invention relates to a snowmobile.

2. Description of the Related Art

Conventionally, a snowmobile including an engine, a vehicle body frame formed of a metal material, skis located on a front portion of the vehicle body frame and a track belt driven by the engine is known. A more lightweight snowmobile receives a smaller running resistance while running on the snow. Therefore, the snowmobile is desired to be reduced in the weight. US2013/0032418 A1 discloses a snowmobile including a metal vehicle body frame partially made of a carbon fiber material, which is more lightweight. US2011/0192667 A1 discloses a snowmobile including a bumper made of a carbon fiber material.

Recently, a carbon fiber-reinforced plastic material, which is more lightweight and more rigid than the carbon fiber material, is adopted for a portion of a vehicle body frame. However, it has not been attempted to replace the carbon fiber material with a carbon fiber-reinforced plastic material in a larger portion of the vehicle body frame, and problems and the like caused by the replacement are not known.

In a snowmobile including a vehicle body frame formed of a metal material, an engine is covered with an engine room formed of a metal material, a vehicle body cover formed of a resin material or the like. Such a structure prevents the engine from being exposed to snow. The vehicle body cover or the like is not provided as a reinforcing member for the vehicle body frame but is provided merely to protect the engine against the snow. A vehicle body frame partially made of a carbon fiber-reinforced plastic material and a vehicle body frame partially formed of a metal material have different advantages and disadvantages. Therefore, a structure of the vehicle body frame formed of a metal material by molding cannot be adopted as it is as the structure of a vehicle body frame made of a carbon fiber-reinforced plastic material by molding.

SUMMARY OF THE INVENTION

Accordingly, preferred embodiments of the present invention provide a snowmobile including a vehicle body frame that is at least partially made of a carbon fiber-reinforced plastic material and thus is guaranteed to have a sufficient strength and a sufficient rigidity and also prevents an engine from being exposed to snow.

A snowmobile according to a preferred embodiment of the present invention includes an engine including a crankshaft; a driving shaft rotatable together with the crankshaft; an endless track belt drivable by the driving shaft; and a vehicle body frame including a wall portion that defines an engine room configured to accommodate the engine and an engine support portion that supports the engine. At least a portion of the wall portion is made of a carbon fiber-reinforced plastic material and overlaps the engine as seen in at least a plan view or a side view.

In a snowmobile according to a preferred embodiment of the present invention, the engine is located in the engine room. Therefore, the engine room is desired to have a high strength and a high rigidity. At least a portion of the wall portion defining the engine room is made of a carbon fiber-reinforced plastic material. This increases the strength and the rigidity of the engine room. The portion of the wall portion that is made of the carbon fiber-reinforced plastic material overlaps the engine as seen in a plan view or a side view. Therefore, snow directed toward the engine from the outside of the engine falls on the wall portion, and thus is prevented from falling on the engine.

According to a preferred embodiment of the present invention, at least a portion of the wall portion includes a first layer made of at least a carbon fiber-reinforced plastic material and a second layer made of a carbon fiber-reinforced plastic material.

According to this preferred embodiment, at least a portion of the wall portion defining the engine room includes at least the first layer and the second layer that are made of a carbon fiber-reinforced plastic material, which is lightweight and highly rigid. This further increases the strength and the rigidity of the engine room.

According to a preferred embodiment of the present invention, the wall portion includes a bottom wall portion located below the engine and made of a carbon fiber-reinforced plastic material; and the snowmobile further includes a protection member located below the bottom wall portion, the protection member being configured to protect the bottom wall portion.

According to this preferred embodiment, the bottom wall portion, of the wall portion, that is located below the engine is made of a carbon fiber-reinforced plastic material. This increases the strength and the rigidity of at least the bottom wall portion. The bottom wall portion prevents the engine from being exposed to snow directed thereto from below the engine. The protection member located below the bottom wall portion prevents abrasion of the bottom wall portion caused by the bottom wall portion contacting the ground while the snowmobile is running.

According to a preferred embodiment of the present invention, the protection member covers the entirety of the bottom wall portion.

According to this preferred embodiment, the protection member prevents abrasion of the bottom wall portion caused by the bottom wall portion contacting the ground while the snowmobile is running. The protection member better prevents the engine from being exposed to snow directed thereto from below the engine.

According to a preferred embodiment of the present invention, the protection member is made of a metal material or a resin material.

According to this preferred embodiment, the protection member, which is made of a metal material or a resin material, is more highly abrasion-resistant than a protection member made of a carbon fiber-reinforced plastic material, and therefore better protects the bottom wall portion. In the case of being made of a metal material, the protection member protects the bottom wall portion against an impact that may be applied from the ground on the bottom wall portion. In the case where the protection member is made of a resin material, an increase in the weight of the vehicle body frame is prevented.

According to a preferred embodiment of the present invention, the snowmobile further includes a steering shaft secured to a handle. The vehicle body frame includes a top vehicle body frame and a bottom vehicle body frame located below the top vehicle body frame; the wall portion includes a top wall portion located above the engine and made of a carbon fiber-reinforced plastic material, the top wall portion defining a portion of the top vehicle body frame; and the top wall portion supports the steering shaft and supports the bottom vehicle body frame at least at two points.

According to this preferred embodiment, the top wall portion is made of a carbon fiber-reinforced plastic material, which is highly rigid, and therefore supports the steering shaft and also supports the bottom vehicle body frame at least at two points. The top wall portion also prevents the engine from being exposed to snow directed thereto from above the engine.

According to a preferred embodiment of the present invention, the top wall portion supports the steering shaft at two points.

According to this preferred embodiment, the top wall portion is made of a carbon fiber-reinforced plastic material, which is highly rigid, and therefore supports the steering shaft at two points. This allows the top wall portion to support the steering shaft more stably.

According to a preferred embodiment of the present invention, the snowmobile further includes a seat supported by the top wall portion.

According to this preferred embodiment, a seat rail does not need to be separately provided to support the seat. This simplifies the structure and decreases the number of components and the cost.

According to a preferred embodiment of the present invention, the snowmobile further includes a fuel tank covered with the top vehicle body frame; and a fuel tank cover configured to cover the fuel tank. The top wall portion defines at least a portion of the fuel tank cover.

According to this preferred embodiment, at least a portion of the fuel tank cover covering the fuel tank is defined by the top wall portion. This simplifies the structure and decreases the number of components and the cost.

According to a preferred embodiment of the present invention, the snowmobile further includes an air suction silencer configured to supply air to the engine. The top wall portion defines a portion of the air suction silencer.

According to this preferred embodiment, a portion of the air suction silencer is defined by the top wall portion. This simplifies the structure and decreases the number of components and the cost.

According to a preferred embodiment of the present invention, the snowmobile further includes a vehicle body cover located outward of the engine. At least a portion of the top vehicle body frame defines a portion of the vehicle body cover.

According to this preferred embodiment, a portion of the vehicle body cover is defined by the top vehicle body frame. This simplifies the structure and decreases the number of components and the cost.

According to a preferred embodiment of the present invention, the engine support portion is provided in the top wall portion.

According to this preferred embodiment, the engine support portion is provided in the top wall portion of the top vehicle body frame. This further simplifies the structure of the bottom vehicle body frame.

According to a preferred embodiment of the present invention, the top vehicle body frame and the bottom vehicle body frame are preferably integral with each other and defined by a single unitary body that is integrally formed by molding, for example.

According to this preferred embodiment, the number of components used to connect the top vehicle body frame and the bottom vehicle body frame to each other is decreased, and the weight of the snowmobile is decreased because of the decrease in the number of components.

According to a preferred embodiment of the present invention, the wall portion includes a left wall portion located to the left of the engine and made of a carbon fiber-reinforced plastic material and a right wall portion located to the right of the engine and made of a carbon fiber-reinforced plastic material; the engine support portion is provided in each of the left wall portion and the right wall portion; and the snowmobile further includes a left ski located to the front of the engine; a right ski located to the front of the engine and to the right of the left ski; a left arm connected to the left ski and swingably supported by the left wall portion at two points; and a right arm connected to the right ski and swingably supported by the right wall portion at two points.

According to this preferred embodiment, the left wall portion and the right wall portion are made of a carbon fiber-reinforced plastic material, which is highly rigid. Therefore, the left wall portion supports the engine and also supports the left arm at two points. The right wall portion supports the engine and also supports the right arm at two points. The left wall portion and the right wall portion prevent the engine from being exposed to snow directed thereto from the left and the right of the engine.

According to a preferred embodiment of the present invention, the portion of the wall portion that is made of the carbon fiber-reinforced plastic material includes a reinforcing member provided therein.

According to this preferred embodiment, the portion of the wall portion that is made of the carbon fiber-reinforced plastic material includes the reinforcing member provided therein. This increases the strength and the rigidity of the portion.

As described above, preferred embodiments of the present invention provide snowmobiles including a vehicle body frame that is at least partially made of a carbon fiber-reinforced plastic material and thus is guaranteed to have a sufficient strength and a sufficient rigidity and also prevents an engine from being exposed to snow.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
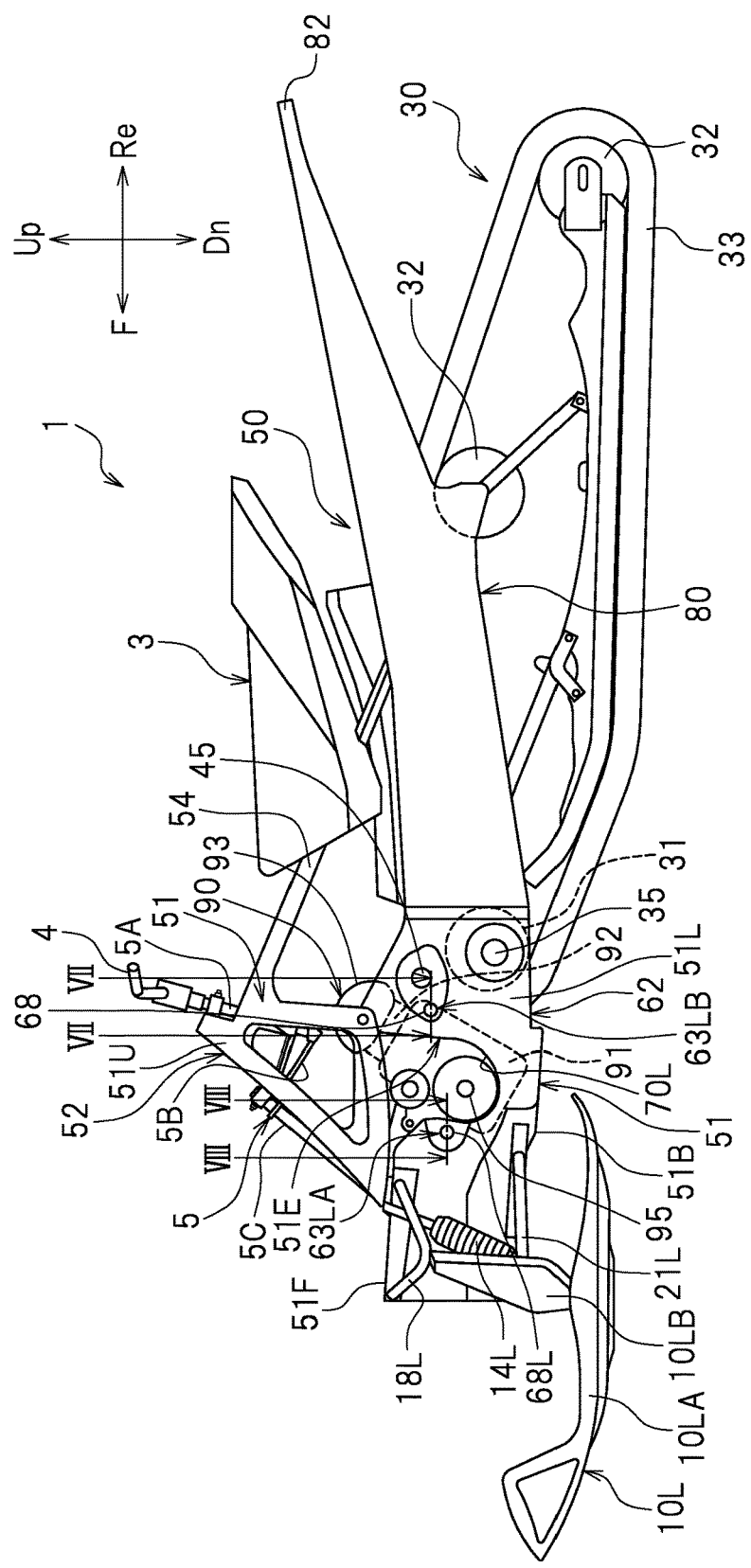
FIG. 1 is a left side view of a snowmobile according to a preferred embodiment of the present invention.

Hereinafter, a first preferred embodiment of the present invention will be described with reference to the drawings. As shown in FIG. 1, a vehicle in this preferred embodiment is a snowmobile 1. The snowmobile 1 is suitable for running on the snow. Vehicles according to various preferred embodiments the present invention are not limited to the snowmobile 1.

In the following description, unless otherwise specified, the terms "front", "rear", "left", "right", "up" and "down" respectively refer to front, rear, left, right, up and down as seen from a rider sitting on a seat 3 of the snowmobile 1. The "up" and "down" respectively refer to up and down in the vertical direction of the snowmobile 1 that is still on a horizontal plane. In the figures, F, Re, L, R, Up and Dn respectively represent front, rear, left, right, up and down. A direction approaching a vehicle center line CL (see FIG. 2) is referred to as "inner" in a vehicle width direction, and a direction away from the vehicle center line CL will be referred to as "outer" in the vehicle width direction. Elements and portions having the same functions will bear identical reference signs and the same descriptions thereof will be omitted or simplified.

As shown in FIG. 1, the snowmobile 1 includes an internal combustion engine (hereinafter, referred to as the "engine") 90, a vehicle body frame 50 that supports the engine 90, the seat 3 that is supported by the vehicle body frame 50 and allows the rider to sit thereon, and a propelling device 30 driven by a driving force of the engine 90.

Figure 2:
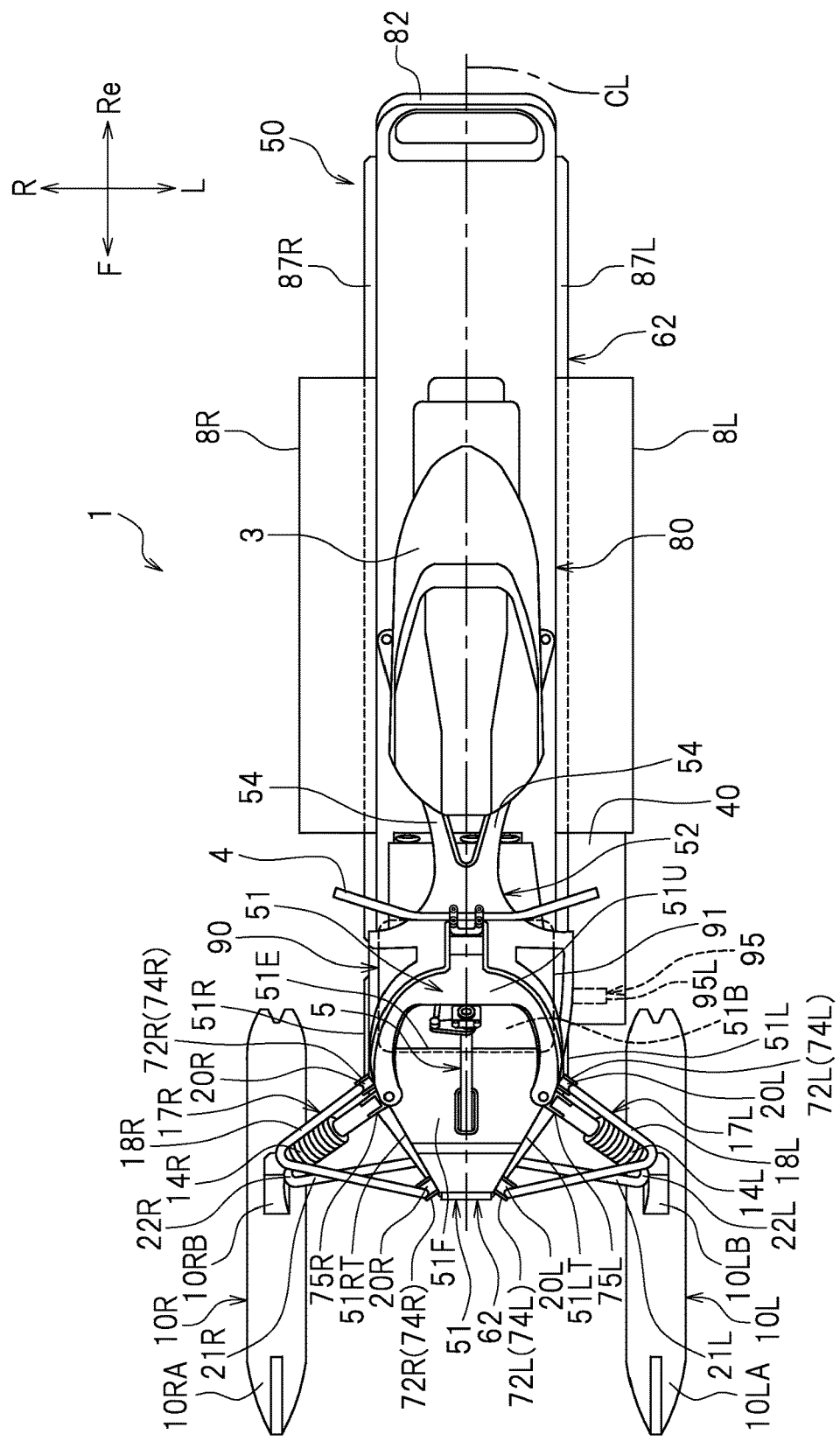
FIG. 2 is a plan view of the snowmobile according to a preferred embodiment of the present invention.
Figure 3:
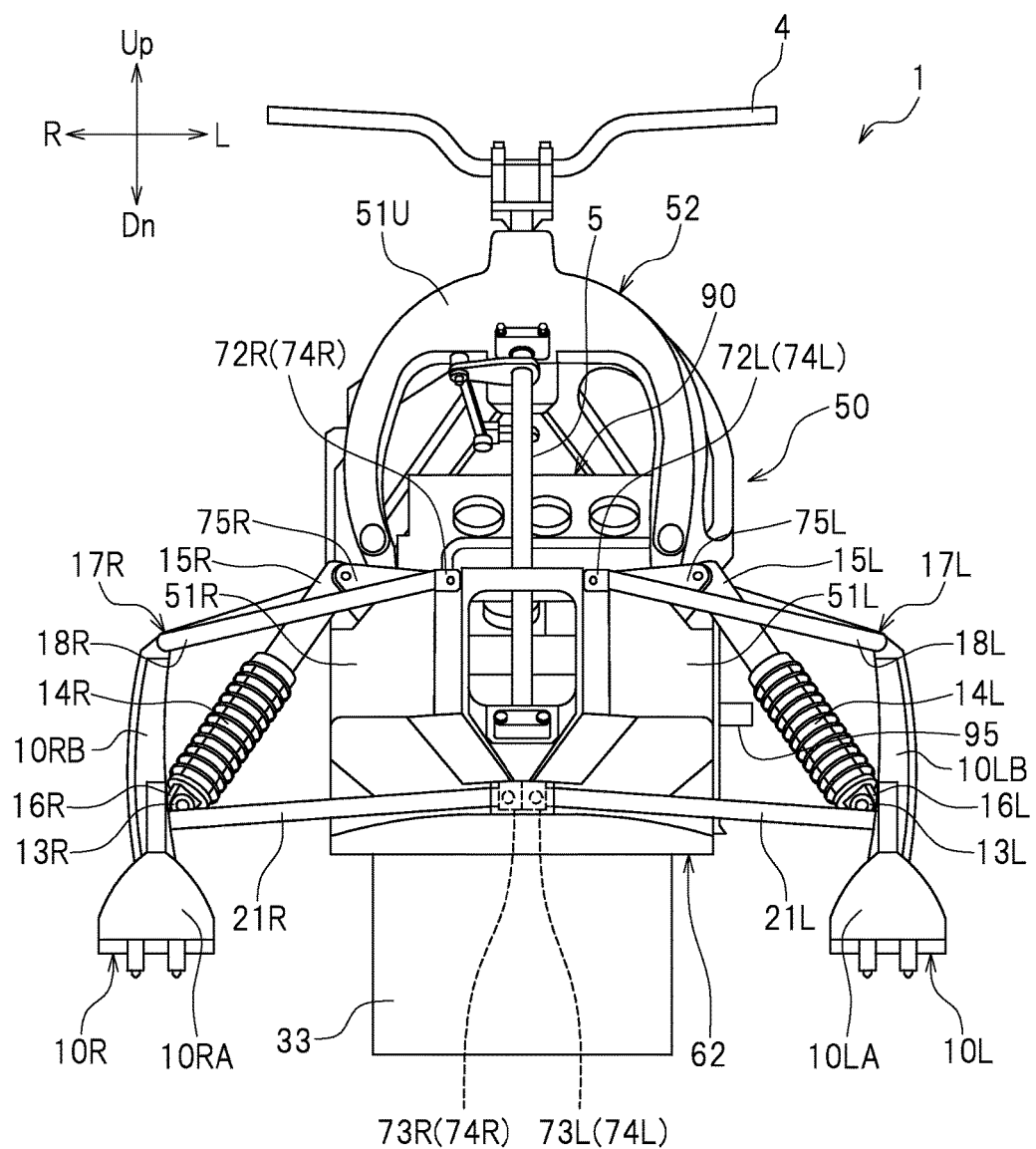
FIG. 3 is a front view of the snowmobile according to a preferred embodiment of the present invention.
Figure 4:
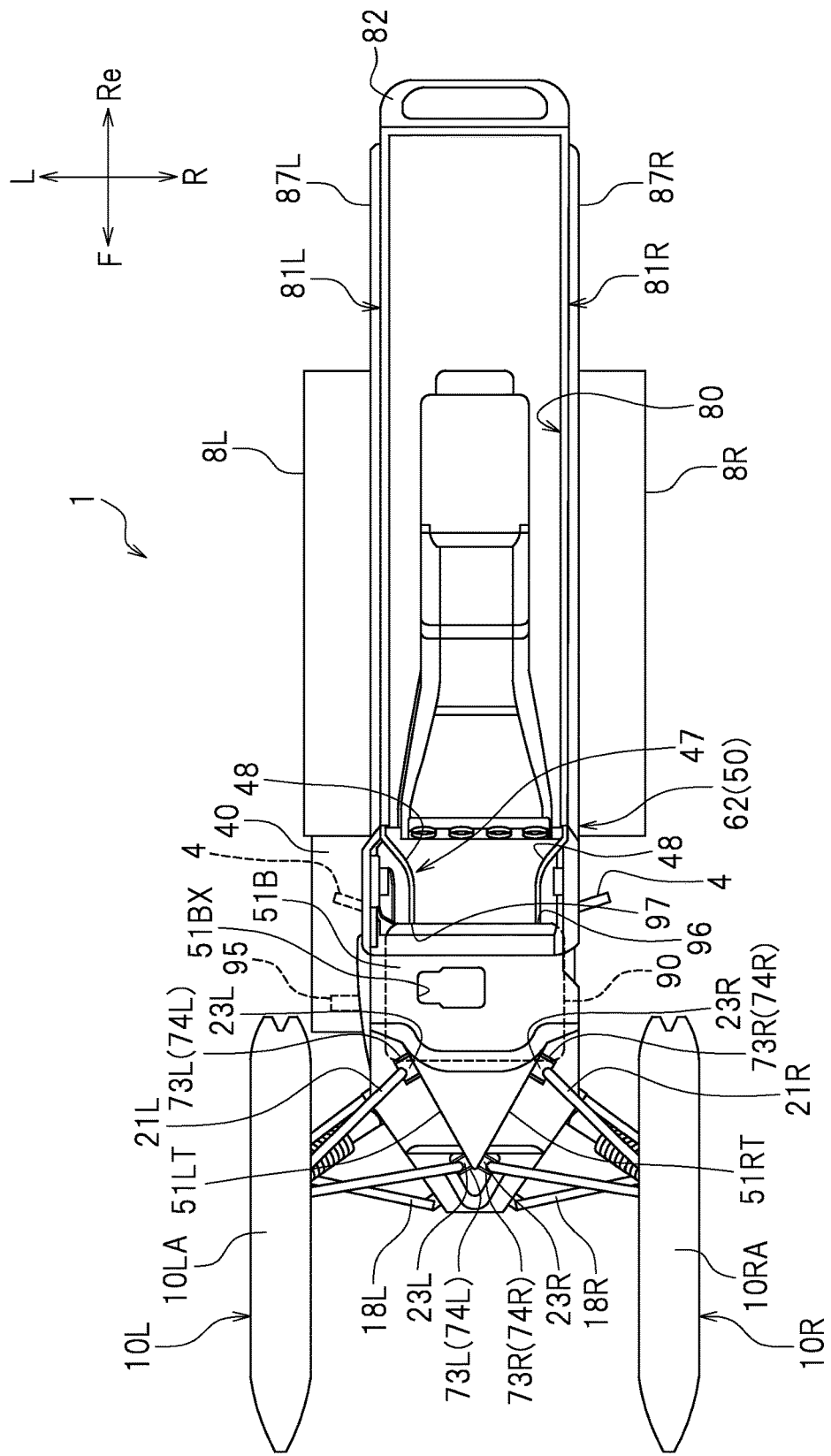
FIG. 4 is a bottom view of the snowmobile according to a preferred embodiment of the present invention.

As shown in FIG. 1, the vehicle body frame 50 includes a top vehicle body frame 52 and a bottom vehicle body frame 62. The bottom vehicle body frame 62 is located below the top vehicle body frame 52. The top vehicle body frame 52 and the bottom vehicle body frame 62 are made of a carbon fiber-reinforced plastic material. The top vehicle body frame 52 and the bottom vehicle body frame 62 may be integrally formed by molding, for example, so as to define a single unitary frame member. The vehicle body frame 50 includes a wall portion 51 that defines an engine room 51E in which the engine 90 is located. The wall portion 51 includes a top wall portion 51U located above the engine 90, a left wall portion 51L located to the left of the engine 90, a right wall portion 51R (see FIG. 3) located to the right of the engine 90, and a bottom wall portion 51B (see FIG. 4) located below the engine 90. The top vehicle body frame 52 includes the top wall portion 51U. The bottom vehicle body frame 62 includes the bottom wall portion 51B, the left wall portion 51L and the right wall portion 51R. The top wall portion 51U, the bottom wall portion 51B, the left wall portion 51L and the right wall portion 51R are made of a carbon fiber-reinforced plastic material. The bottom wall portion 51B is a connecting wall portion that connects the left wall portion 51L and the right wall portion 51R to each other. The bottom wall portion 51B, the left wall portion 51L and the right wall portion 51R preferably are integrally formed by molding, so as to provide a single unitary member. As shown in FIG. 2, the wall portion 51 includes a front wall portion 51F that connects the left wall portion 51L and the right wall portion 51R to each other. The front wall portion 51F is located to the front of the engine 90. The front wall portion 51F is located above the bottom wall portion 51B. The front wall portion 51F is located below the top wall portion 51U. The bottom wall portion 51B overlaps the engine 90 as seen in a vehicle plan view. As shown in FIG. 1, the left wall portion 51L overlaps the engine 90 as seen in a vehicle side view. The right wall portion 51R overlaps the engine 90 as seen in a vehicle side view. The bottom vehicle body frame 62 may include a top wall portion located above the engine 90. In this case, the top wall portion is preferably a connection wall portion that connects the left wall portion 51L and the right wall portion 51R to each other. The top wall portion, the left wall portion 51L and the right wall portion 51R may be integrally formed by molding so as to define a single unitary member. In FIG. 4, the propelling device 30 is not shown for the sake of illustration.

The carbon fiber-reinforced plastic material has a specific strength higher than that of a metal material such as aluminum or the like. In other words, when the strength of the carbon fiber-reinforced plastic material and the strength of the metal material are the same, the carbon fiber-reinforced plastic material is more lightweight than the metal material.

Figure 5:
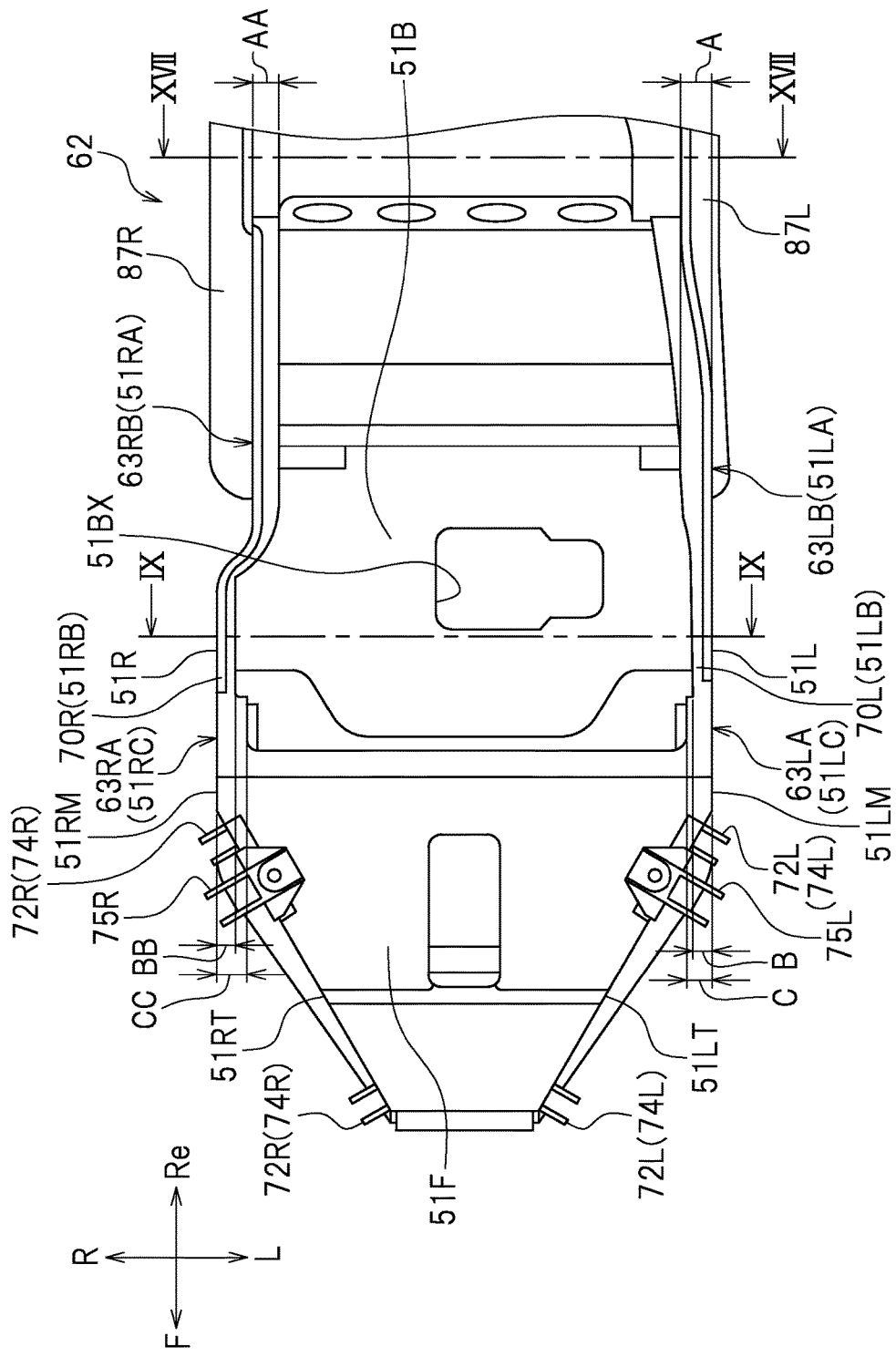
FIG. 5 is a plan view showing a portion of a bottom vehicle body frame according to a preferred embodiment of the present invention.

As shown in FIG. 1, the bottom vehicle body frame 62 includes a first left engine support portion 63LA, a second left engine support portion 63LB, a first right engine support portion 63RA (see FIG. 5) and a second right engine support portion 63RB (see FIG. 5). The first left engine support portion 63LA, the second left engine support portion 63LB, the first right engine support portion 63RA and the second right engine support portion 63RB support the engine 90. As shown in FIG. 5, the first left engine support portion 63LA faces the first right engine support portion 63RA. The second left engine support portion 63LB faces the second right engine support portion 63RB. The second left engine support portion 63LB is located to the rear of the first left engine support portion 63LA. The second right engine support portion 63RB is located to the rear of the first right engine support portion 63RA. The first left engine support portion 63LA and the second left engine support portion 63LB are provided in the left wall portion 51L. The first right engine support portion 63RA and the second right engine support portion 63RB are provided in the right wall portion 51R. The left wall portion 51L is provided with a recessed portion 70L (also see FIG. 1). The right wall portion 51R is provided with a recessed portion 70R.

As shown in FIG. 5, the left wall portion 51L includes a first portion 51LA in which the second left engine support portion 63LB is provided, a second portion 51LB located to the front of the first portion 51LA and provided with the recessed portion 70L, and a third portion 51LC located to the front of the second portion 51LB. The first left engine support portion 63LA is provided in the third portion 51LC. Size A, which is the size of the first portion 51LA in the vehicle width direction, is larger than size B, which is the size of the second portion 51LB in the vehicle width direction. In other words, the first portion 51LA preferably is thicker than the second portion 51LB. Size C, which is the size of the third portion 51LC in the vehicle width direction, is larger than size B, which is the size of the second portion 51LB in the vehicle width direction. In other words, the third portion 51LC preferably is thicker than the second portion 51LB.

As shown in FIG. 5, the right wall portion 51R includes a first portion 51RA in which the second right engine support portion 63RB is provided, a second portion 51RB located to the front of the first portion 51RA and provided with the recessed portion 70R, and a third portion 51RC located to the front of the second portion 51RB. The first right engine support portion 63RA is provided in the third portion 51RC. Size AA, which is the size of the first portion 51RA in the vehicle width direction, is larger than size BB, which is the size of the second portion 51RB in the vehicle width direction. In other words, the first portion 51RA preferably is thicker than the second portion 51RB. Size CC, which is the size of the third portion 51RC in the vehicle width direction, is larger than size BB, which is the size of the second portion 51RB in the vehicle width direction. In other words, the third portion 51RC preferably is thicker than the second portion 51RB. In FIG. 5, the engine 90 is not shown for the sake of convenience of illustration.

Now, the second left engine support portion 63LB will be described. The first left engine support portion 63LA, the first right engine support portion 63RA and the second right engine support portion 63RB each preferably have the same or substantially the same structure as that of the second left engine support portion 63LB, and thus will not be described.

Figure 6:
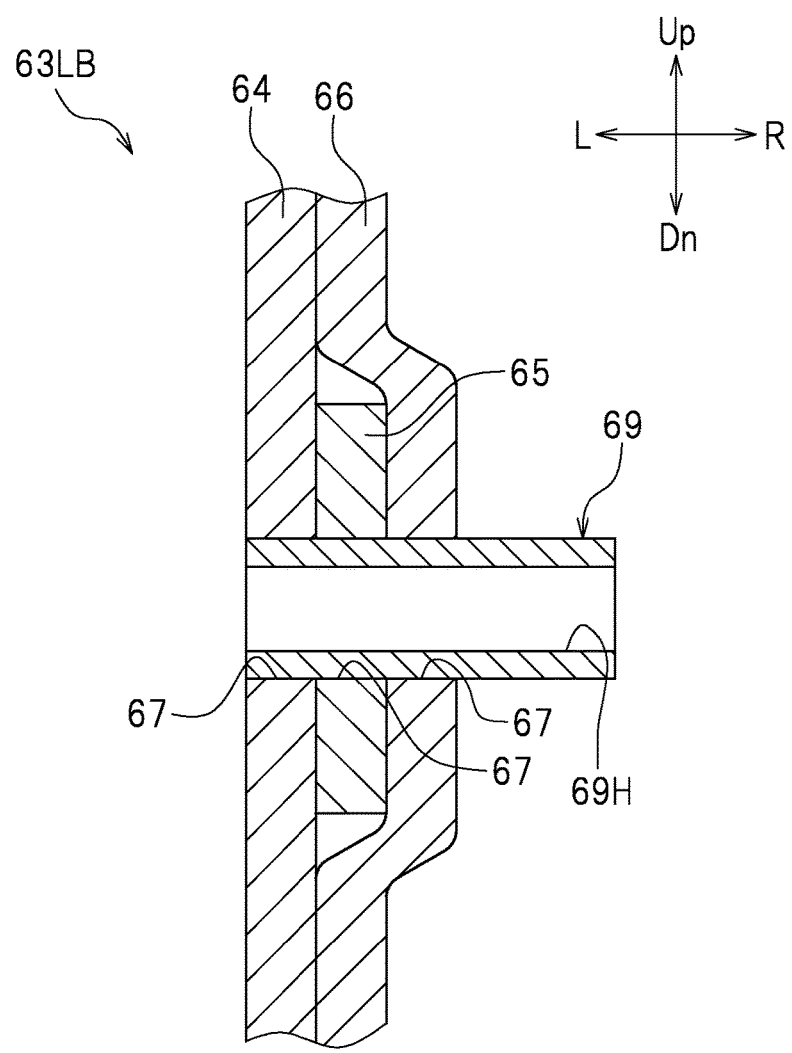
FIG. 6 is a cross-sectional view schematically showing a second left engine support portion according to a preferred embodiment of the present invention.

As shown in FIG. 6, the second left engine support portion 63LB includes a first layer 64 made of a carbon fiber-reinforced plastic material, a second layer 66 made of a carbon fiber-reinforced plastic material, and an intermediate layer 65 located between the first layer 64 and the second layer 66. It is sufficient that at least a portion of the intermediate layer 65 is located between the first layer 64 and the second layer 66. The intermediate layer 65 is a reinforcing member that reinforces the first layer 64 and the second layer 66. In this preferred embodiment, the intermediate layer 65 includes a layer made of a carbon fiber-reinforced plastic material. The intermediate layer 65 may include two or more layers made of a carbon fiber-reinforced plastic material. The intermediate layer 65 may be made of a fiber material such as aramid fiber or the like, a metal material such as aluminum or the like, or a resin material such as a urethane resin or the like. In the case of being made of a metal material or a resin material, the intermediate layer 65 preferably has a honeycomb structure. The first layer 64, the intermediate layer 65 and the second layer 66 are located in this order from the outer side to the inner side in the vehicle width direction. The first layer 64, the second layer 66 and the intermediate layer 65 preferably are integrally formed by molding so as to provide a single unitary member. The first layer 64, the intermediate layer 65 and the second layer 66 are provided with a through-hole 67 running therethrough in the vehicle width direction. A securing member 68 (see FIG. 7) that secures the engine 90 (see FIG. 1) and the bottom vehicle body frame 62 (see FIG. 1) to each other is inserted into the through-hole 67. In this preferred embodiment, a metal pipe 69 is provided in the through-hole 67. The securing member 68 is inserted into an insertion hole 69H in the pipe 69 and secures the engine 90 and the bottom vehicle body frame 62 to each other. The securing member 68 is inserted into the through-hole 67 via the pipe 69.

Figure 7:
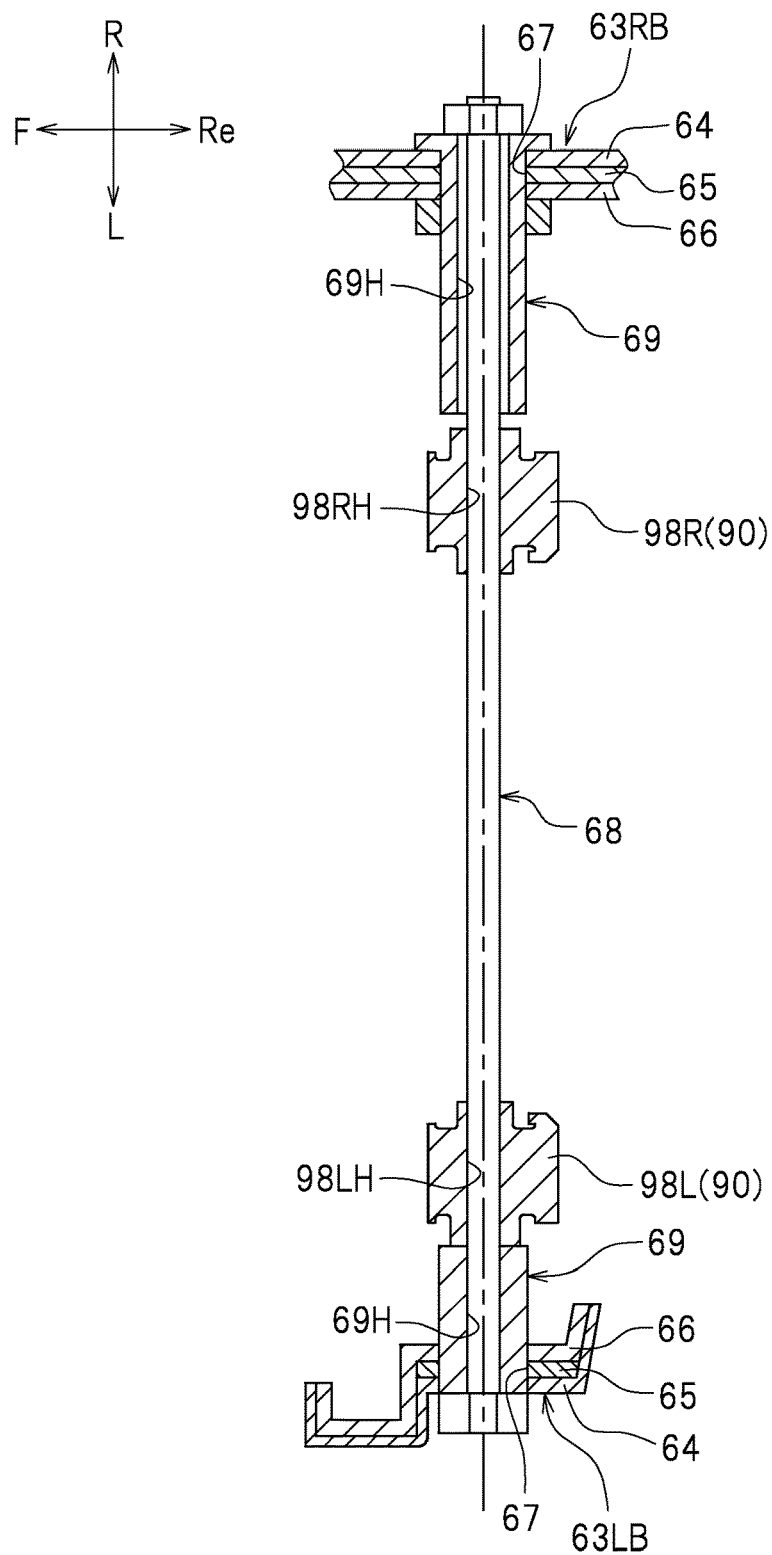
FIG. 7 is a cross-sectional view taken along line VII-VII in FIG. 1.

As shown in FIG. 7, the engine 90 includes a left boss portion 98L provided with an insertion hole 98LH and a right boss portion 98R provided with an insertion hole 98RH. The securing member 68, which is rod-shaped and extends in a vehicle left-right direction, is inserted into the insertion hole 69H in the second left engine support portion 63LB, the insertion hole 98LH in the left boss portion 98L, the insertion hole 98RH in the second right boss portion 98R, and the insertion hole 69H in the second right engine support portion 63RB. The securing member 68 secures the engine 90 to the bottom vehicle body frame 62.

Figure 8:
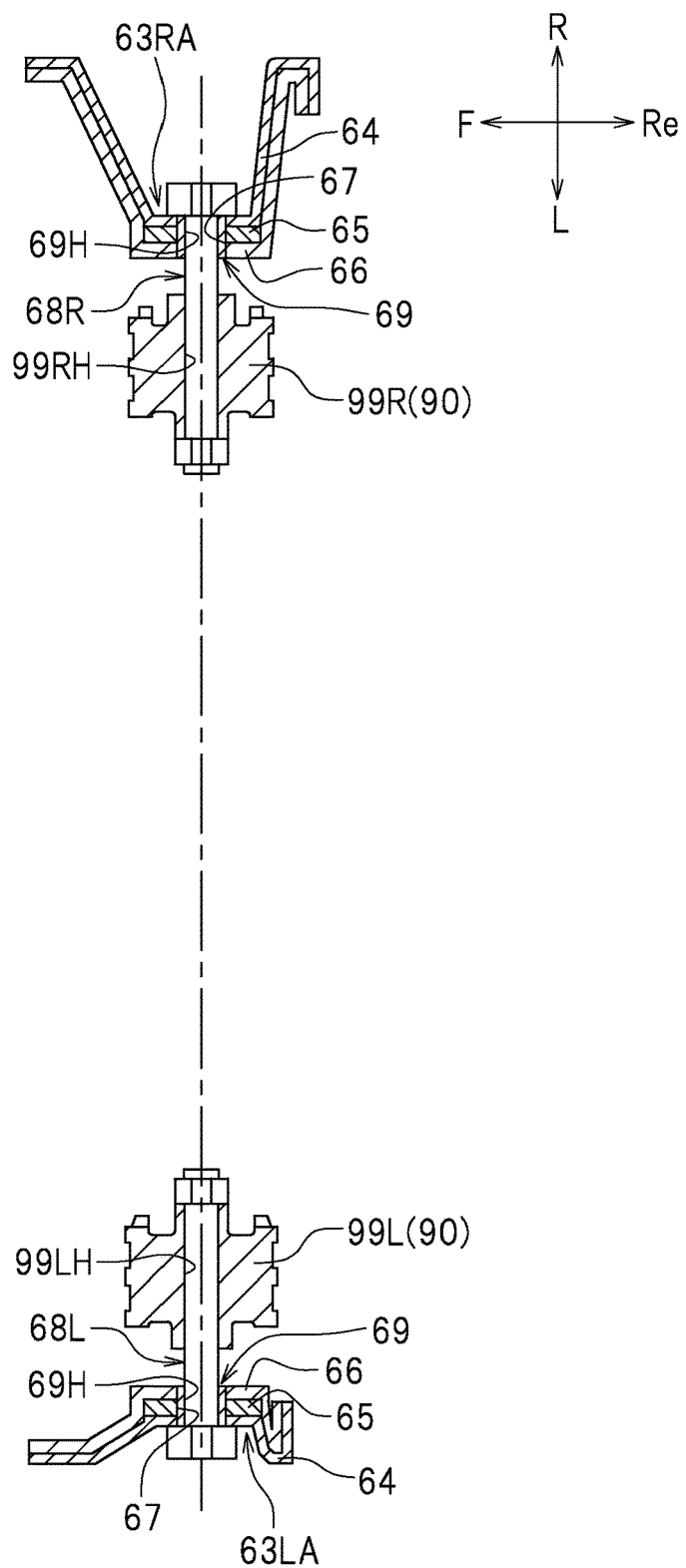
FIG. 8 is a cross-sectional view taken along line VIII-VIII in FIG. 1.

As shown in FIG. 8, the engine 90 includes a left boss portion 99L provided with an insertion hole 99LH and a right boss portion 99R provided with an insertion hole 99RH. A rod-shaped securing member 68L extending in the vehicle left-right direction is inserted into the insertion hole 69H in the first left engine support portion 63LA and the insertion hole 99LH in the left boss portion 99L. A rod-shaped securing member 68R extending in the vehicle left-right direction is inserted into the insertion hole 69H in the first right engine support portion 63RA and the insertion hole 99RH in the right boss portion 99R. The securing members 68L and 68R secure the engine 90 to the bottom vehicle body frame 62.

Figure 9:
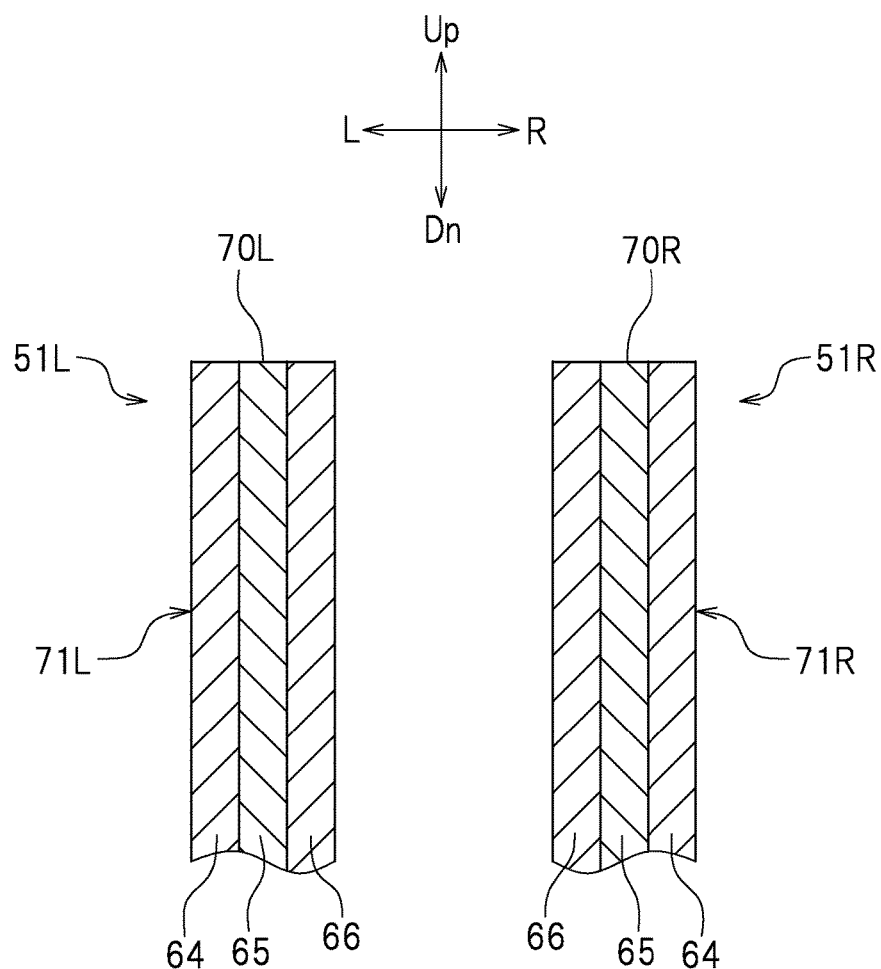
FIG. 9 is a cross-sectional view taken along line IX-IX in FIG. 5.

As shown in FIG. 9, a portion of the left wall portion 51L, more specifically, a peripheral portion 71L along the recessed portion 70L, includes the first layer 64, the second layer 66, and the intermediately layer 65 located between the first layer 64 and the second layer 66. A portion of the right wall portion 51R, more specifically, a peripheral portion 71R along the recessed portion 70R, includes the first layer 64, the second layer 66, and the intermediately layer 65 located between the first layer 64 and the second layer 66.

Figure 10:
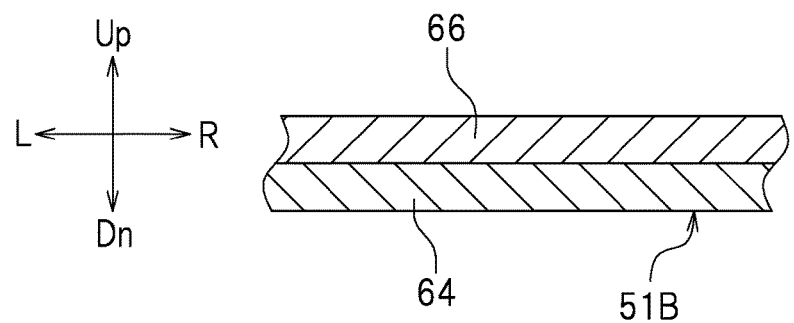
FIG. 10 is a cross-sectional view of a bottom wall portion according to a preferred embodiment of the present invention.

Referring to FIG. 10, the bottom wall portion 51B is made of a carbon fiber-reinforced plastic material. The bottom wall portion 51B includes the first layer 64 and the second layer 66. The bottom wall portion 51B may include the intermediate layer 65 (see FIG. 9) between the first layer 64 and the second layer 66. As shown in FIG. 4, the bottom wall portion 51B is provided with an opening 51BX. Oil circulating in the engine 90 is discharged to the outside of the bottom vehicle body frame 62 via the opening 51BX.

Figure 11:
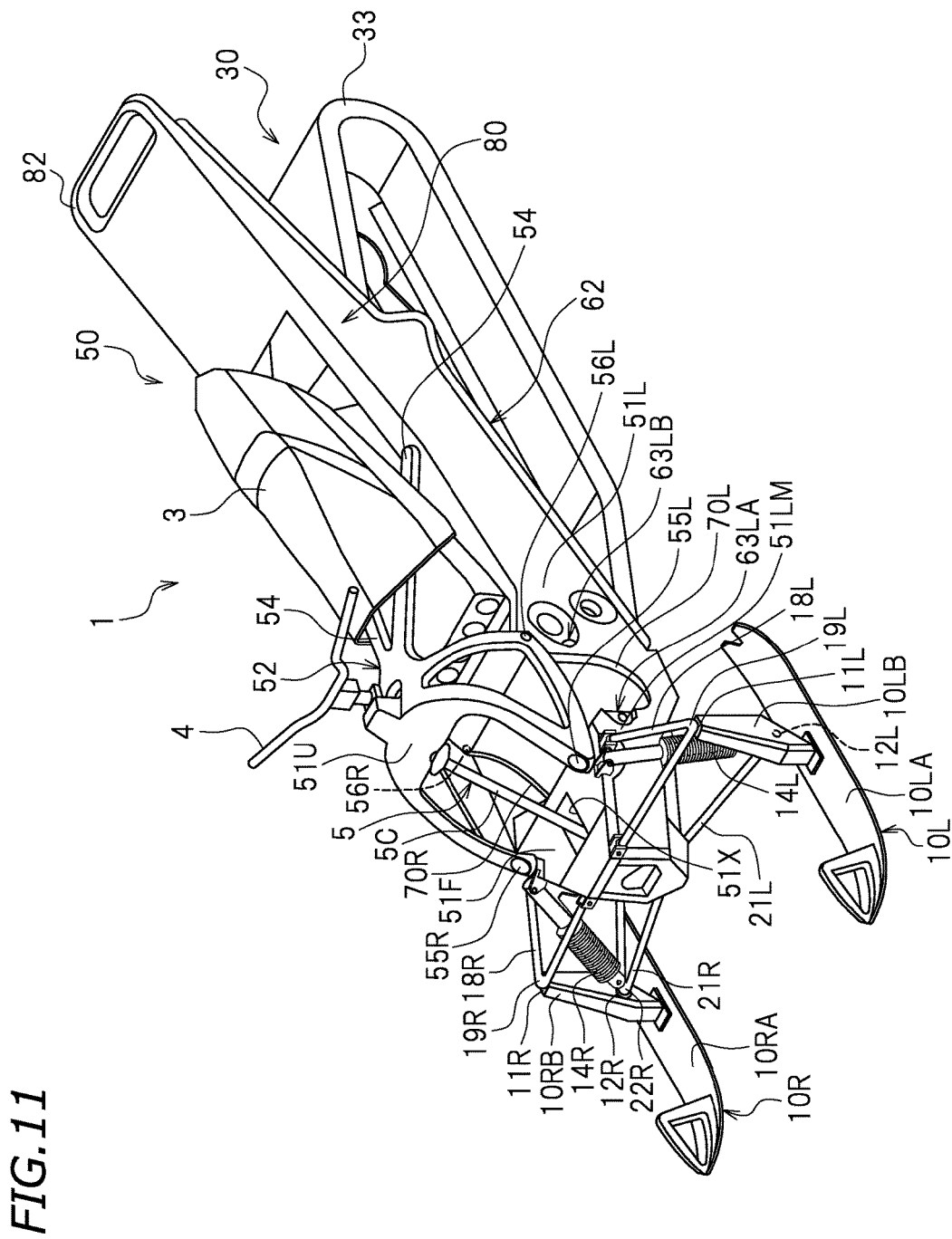
FIG. 11 is a perspective view of the snowmobile according to a preferred embodiment of the present invention.
Figure 12:
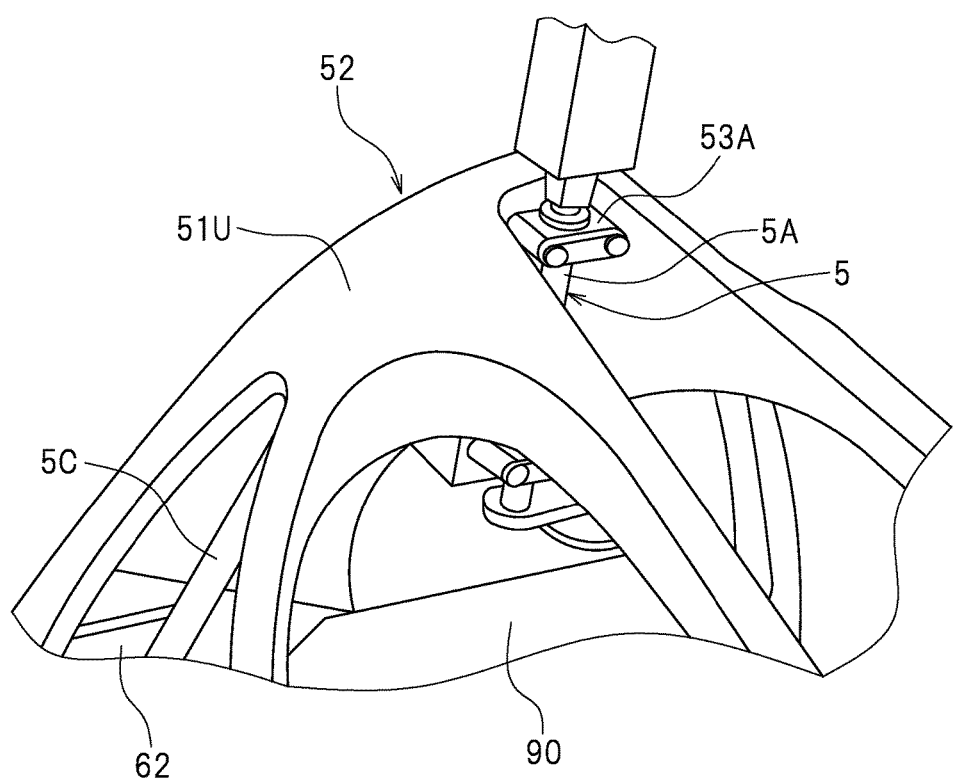
FIG. 12 is a perspective view showing a structure of a steering shaft and elements in the vicinity thereof according to a preferred embodiment of the present invention.
Figure 13:
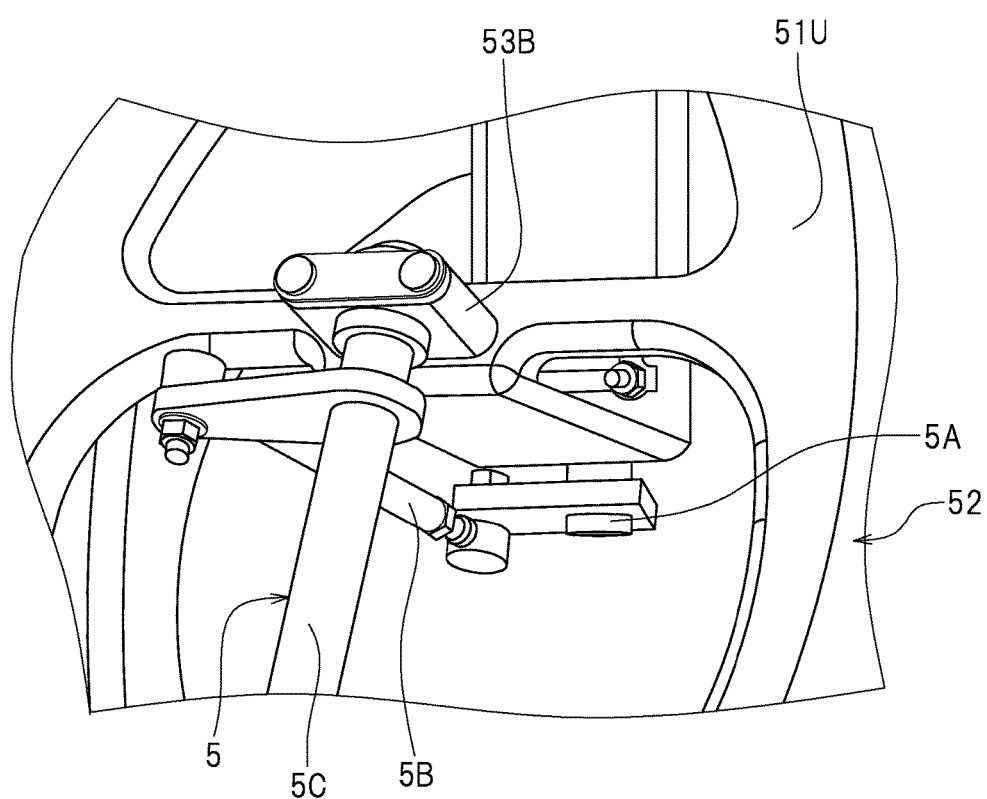
FIG. 13 is a perspective view showing a structure of the steering shaft and the elements in the vicinity thereof according to a preferred embodiment of the present invention.

As shown in FIG. 11, the snowmobile 1 includes a handle 4 and a steering shaft 5 coupled to the handle 4. As shown in FIG. 1, the steering shaft 5 includes a first shaft 5A extending downward from the handle 4, a second shaft 5B coupled to the first shaft 5A and extending in a vehicle front-rear direction, and a third shaft 5C coupled to the second shaft 5B and extending in an up-down direction. As shown in FIG. 12, the first shaft 5A is rotatably supported by a first shaft support portion 53A provided in the top wall portion 51U of the top vehicle body frame 52. As shown in FIG. 13, the third shaft 5C is rotatably supported by a second shaft support portion 53B provided in the top wall portion 51U of the top vehicle body frame 52. Although not shown, the third shaft 5C of the steering shaft 5 is inserted into an opening 51X (FIG. 11) provided in the front wall portion 51F (see FIG. 11) and is coupled to a left ski 10L and a right ski 10R described below.

As shown in FIG. 2, the top vehicle body frame 52 includes a pair of seat frames 54, more specifically, left and right seat frames 54. The seat frames 54 extend rearward from the top wall portion 51U. The seat frames 54 are supported by the bottom vehicle body frame 62. The seat frames 54 are supported by a tunnel portion 80 described below. The seat 3 is supported by the seat frames 54. As shown in FIG. 11, the top wall portion 51U includes a first left support portion 55L connected to the front wall portion 51F, a first right support portion 55R located to the right of the first left support portion 55L and connected to the front wall portion 51F, a second left support portion 56L connected to the left wall portion 51L, and a second right support portion 56R connected to the right wall portion 51R (see FIG. 3). The top wall portion 51U supports the bottom vehicle body frame 62 at the first left support portion 55L, the first right support portion 55R, the second left support portion 56L and the second right support portion 56R. In FIG. 11, the engine 90 is not shown for the sake of convenience of illustration.

Figure 14:
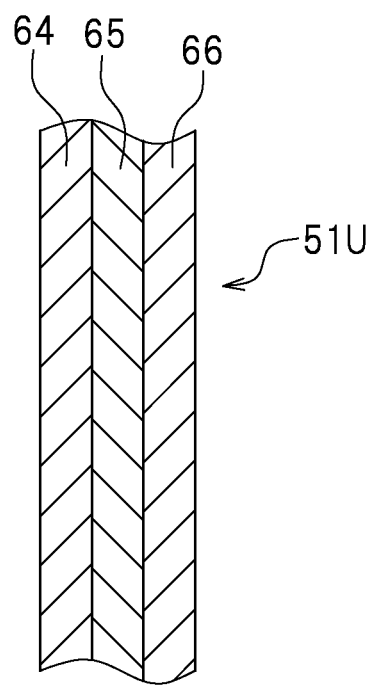
FIG. 14 is a cross-sectional view of a top wall portion according to a preferred embodiment of the present invention.

Referring to FIG. 14, the top wall portion 51U is made of a carbon fiber-reinforced plastic material. The top wall portion 51U includes the first layer 64, the second layer 66, and the intermediate layer 65 located between the first layer 64 and the second layer 66. It is sufficient that the top wall portion 51U includes at least the first layer 64 and the second layer 66.

The vehicle body frame 50 is preferably formed by autoclave molding by as follows, for example. Prepreg members (carbon fiber-reinforced plastic material) cut into a predetermined shape are stacked and cured by autoclaving. Thus, the vehicle body frame 50 having a desired shape is formed.

As shown in FIG. 2, the snowmobile 1 includes the left ski 10L, the right ski 10R, a left shock absorber 14L, aright shock absorber 14R, a left arm 17L and a right arm 17R. As shown in FIG. 3, the left arm 17L includes a first left arm 18L and a second left arm 21L located below the first left arm 18L. The right arm 17R includes a first right arm 18R and a second right arm 21R located below the first right arm 18R.

As shown in FIG. 2, the left ski 10L and the right ski 10R are located to the front of the engine 90. The right ski 10R is located to the right of the left ski 10L. As shown in FIG. 11, the left ski 10L includes a ski portion 10LA and a knuckle portion 10LB. The left ski 10L includes a first left arm coupling portion 11L connected to the first left arm 18L and a second left arm coupling portion 12L connected to the second left arm 21L. The first left arm coupling portion 11L and second left arm coupling portion 12L are provided in the knuckle portion 10LB. The right ski 10R includes a ski portion 10RA and a knuckle portion 10RB. The right ski 10R includes a first right arm coupling portion 11R connected to the first right arm 18R and a second right arm coupling portion 12R connected to the second right arm 21R. The first right arm coupling portion 11R and the second right arm coupling portion 12R are provided in the knuckle portion 10RB.

As shown in FIG. 11, the first left arm 18L includes a first left ski connection portion 19L swingably connected to the left ski 10L. The first left ski connection portion 19L is coupled to the first left arm coupling portion 11L. The first right arm 18R includes a first right ski connection portion 19R swingably connected to the right ski 10R. The first right ski connection portion 19R is coupled to the first right arm coupling portion 11R.

As shown in FIG. 2, the second left arm 21L includes a second left ski connection portion 22L swingably connected to the left ski 10L. The second left ski connection portion 22L is coupled to the second left arm coupling portion 12L (see FIG. 11). The second right arm 21R includes a second right ski connection portion 22R swingably connected to the right ski 10R. The second right ski connection portion 22R is coupled to the second right arm coupling portion 12R.

As shown in FIG. 3, the second left arm 21L includes a left shock absorber coupling portion 13L connected to the left shock absorber 14L. The second right arm 21R includes a right shock absorber coupling portion 13R connected to the right shock absorber 14R.

Figure 15:
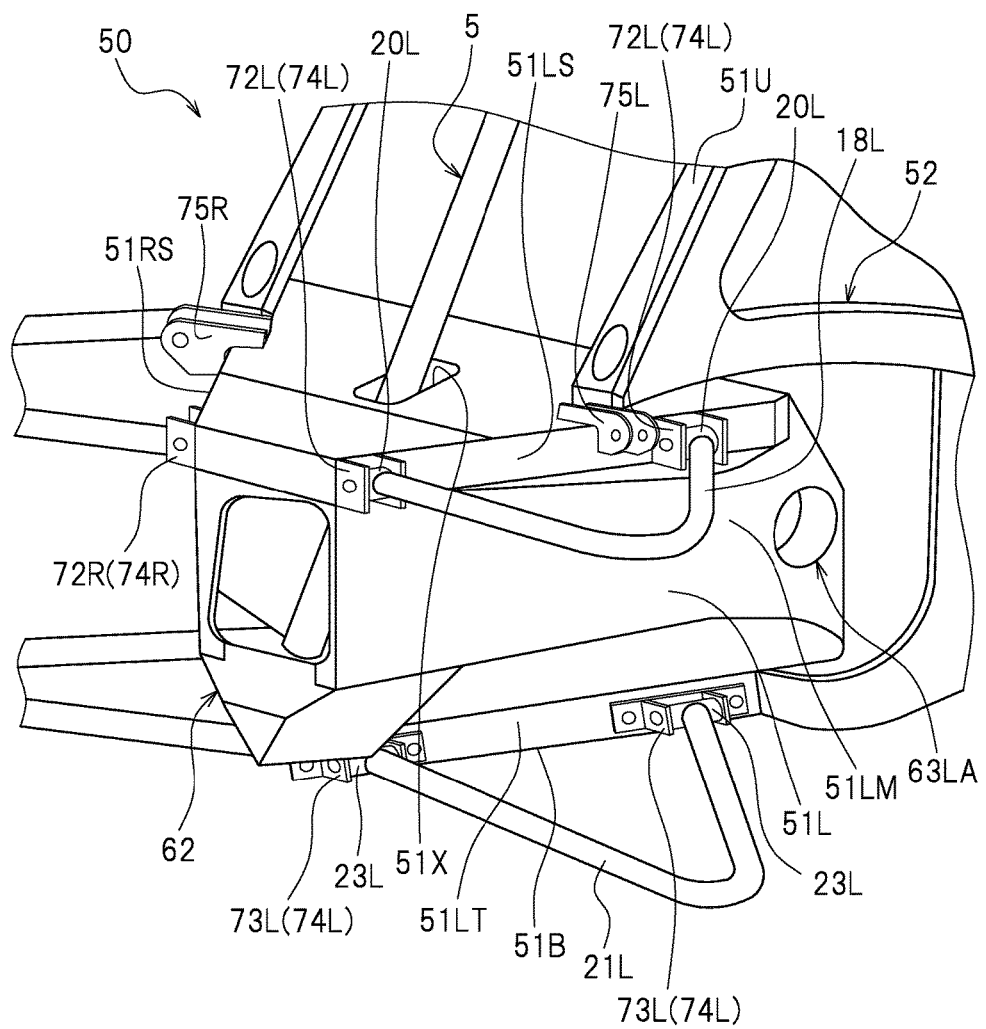
FIG. 15 is a perspective view showing a structure of a left arm and elements in the vicinity thereof according to a preferred embodiment of the present invention.

As shown in FIG. 2, the first left arm 18L includes a pair of first left frame connection portions 20L (also see FIG. 15) swingably connected to the vehicle body frame 50. The first left frame connection portions 20L are swingably connected to the bottom vehicle body frame 62. The first left arm 18L is connected to the left wall portion 51L. The first left arm 18L is swingably supported by the left wall portion 51L at two points. The first right arm 18R includes a pair of first right frame connection portions 20R swingably connected to the vehicle body frame 50. The first right frame connection portions 20R are swingably connected to the bottom vehicle body frame 62. The first right arm 18R is connected to the right wall portion 51R. The first right arm 18R is swingably supported by the right wall portion 51R at two points. In FIG. 15, the left ski 10L, the right ski 10R, the left shock absorber 14L and the left shock absorber coupling portion 13L are not shown.

As shown in FIG. 4, the second left arm 21L includes a pair of second left frame connection portions 23L swingably connected to the vehicle body frame 50. The second left frame connection portions 23L are swingably connected to the bottom vehicle body frame 62. The second left arm 21L is connected to the left wall portion 51L. The second left arm 21L is swingably supported by the left wall portion 51L at two points. The second right arm 21R includes a pair of second right frame connection portions 23R swingably connected to the vehicle body frame 50. The second right frame connection portions 23R are swingably connected to the bottom vehicle body frame 62. The second right arm 21R is connected to the right wall portion 51R. The second right arm 21R is swingably supported by the right wall portion 51R at two points.

Referring to FIG. 4, the second left arm 21L is made of a material having a malleability higher than that of a portion 51LT, of the left wall portion 51L, on which a pair of second left arm connection portions 73L are provided. The second right arm 21R is made of a material having a malleability higher than that of a portion 51RT, of the right wall portion 51R, on which a pair of second right arm connection portions 73R are provided. The second left arm 21L and the second right arm 21R are made of a material having a malleability higher than that of a carbon fiber-reinforced plastic material. The first left arm 18L may be made of a material having a malleability higher than that of the portion 51LT (see FIG. 2), on which a pair of first left arm connection portions 72L described below are provided. The first right arm 18R may be made of a material having a malleability higher than that of the portion 51RT (see FIG. 2), on which a pair of first right arm connection portions 72R described below are provided. The knuckle portion 10LB may be made of a material having a malleability higher than that of the portion 51LT. The knuckle portion 10RB may be made of a material having a malleability higher than that of the portion 51RT. A member made of a material having a malleability higher than that of the portion 51LT may be provided between the knuckle portion 10LB and the first left arm 18L and between the knuckle portion 10LB and the second left arm 21L. A member made of a material having a malleability higher than that of the portion 51RT may be provided between the knuckle portion 10RB and the first right arm 18R and between the knuckle portion 10RB and the second right arm 21R.

As shown in FIG. 3, the left shock absorber 14L includes a left bottom end portion 16L swingably connected to the left arm 17L. The left bottom end portion 16L is connected to the left shock absorber coupling portion 13L of the second left arm 21L. The left shock absorber 14L includes a left top end portion 15L swingably connected to the vehicle body frame 50. The left top end portion 15L is swingably connected to the bottom vehicle body frame 62.

As shown in FIG. 3, the right shock absorber 14R is located to the right of the left shock absorber 14L. The right shock absorber 14R includes a right bottom end portion 16R swingably connected to the left arm 17R. The right bottom end portion 16R is connected to the right shock absorber coupling portion 13R of the second right arm 21R. The right shock absorber 14R includes a right top end portion 15R swingably connected to the vehicle body frame 50. The right top end portion 15R is swingably connected to the bottom vehicle body frame 62.

As shown in FIG. 2, the bottom vehicle body frame 62 includes a left arm connection portion 74L and a right arm connection portion 74R. The left arm connection portion 74L includes the pair of first left arm connection portions 72L and the pair of second left arm connection portions 73L (see FIG. 4). The first left arm connection portions 72L are located above the second left arm connection portions 73L. The first left arm connection portions 72L are connected to the first left frame connection portions 20L. As shown in FIG. 4, the second left arm connection portions 73L are connected to the second left frame connection portions 23L. As shown in FIG. 2, the right arm connection portion 74R includes the pair of first right arm connection portions 72R and the pair of second right arm connection portions 73R (see FIG. 4). The first right arm connection portions 72R are located above the second right arm connection portions 73R. The first right arm connection portions 72R are connected to the first right frame connection portions 20R. As shown in FIG. 4, the second right arm connection portions 73R are connected to the second right frame connection portions 23R. The first left arm connection portions 72L, the second left arm connection portions 73L, the first right arm connection portions 72R and the second right arm connection portions 73R are made of a metal material.

As shown in FIG. 3, the first left arm connection portions 72L and the second left arm connection portions 73L are provided on the left wall portion 51L. The first right arm connection portions 72R and the second right arm connection portions 73R are provided on the right wall portion 51R. Referring to FIG. 15, a portion 51LS of the left wall portion 51L on which the first left arm connection portions 72L are provided, and the portion 51LT of the left wall portion 51L on which the second left arm connection portions 73L are provided, are made of a carbon fiber-reinforced plastic material. A portion 51RS of the right wall portion 51R on which the first right arm connection portions 72R are provided, and the portion 51RT (see FIG. 4) of the right wall portion 51R on which the second right arm connection portions 73R are provided, are made of a carbon fiber-reinforced plastic material. The portion 51LS on which the first left arm connection portions 72L are provided, the portion 51LT on which the second left arm connection portions 73L are provided, the portion 51RS on which the first right arm connection portions 72R are provided, and the portion 51RT on which the second right arm connection portions 73R are provided, include the first layer 64 (see FIG. 6) made of a carbon fiber-reinforced plastic material and the second layer 66 (see FIG. 6) made of a carbon fiber-reinforced plastic material. The intermediate layer 65 may be located between the first layer 64 and the second layer 66.

As shown in FIG. 2, the bottom vehicle body frame 62 includes a left shock absorber connection portion 75L and a right shock absorber connection portion 75R. As shown in FIG. 3, the left shock absorber connection portion 75L is connected to the left top end portion 15L. The right shock absorber connection portion 75R is connected to the right top end portion 15R. The left shock absorber connection portion 75L and the right shock absorber connection portion 75R are made of a metal material. As shown in FIG. 2, the left shock absorber connection portion 75L is located between the pair of first left arm connection portions 72L. The left shock absorber connection portion 75L is provided on the left wall portion 51L. The left shock absorber connection portion 75L is provided on the portion 51LS (see FIG. 15) of the left wall portion 51L. The right shock absorber connection portion 75R is located between the pair of first right arm connection portions 72R. The right shock absorber connection portion 75R is provided on the right wall portion 51R. The right shock absorber connection portion 75R is provided on the portion 51RS (see FIG. 15) of the right wall portion 51R. As shown in FIG. 5, a portion 51LM of the left wall portion 51L that is between the first left engine support portion 63LA and the left shock absorber connection portion 75L includes the first layer 64, the second layer 66 and the intermediate layer 65. It is sufficient that the portion 51LM includes at least the first layer 64 and the second layer 66. A portion 51RM of the right wall portion 51R that is between the first right engine support portion 63RA and the right shock absorber connection portion 75R includes the first layer 64, the second layer 66 and the intermediate layer 65. It is sufficient that the portion 51RM includes at least the first layer 64 and the second layer 66.

As shown in FIG. 1, the engine 90 is located in the engine room 51E. The engine 90 includes a crankcase 91, a cylinder block 92 connected to the crankcase 91, and a cylinder head 93 connected to the cylinder block 92. The cylinder block 92 extends obliquely upward and rearward from the crankcase 91. The engine 90 includes a crankshaft 95 extending in the vehicle width direction. Inside the cylinder head 93 and the cylinder block 92, a combustion chamber (not shown) is provided. Fuel combusts in the combustion chamber, and thus the crank shaft 95 is rotated. As shown in FIG. 2, the crank shaft 95 extends leftward from the crankcase 91. A left end portion 95L of the crank shaft 95 is located in the recessed portion 70L (see FIG. 1) provided in the left wall portion 51L. A right end portion (not shown) of the crank shaft 95 may be located in the recessed portion 70R (see FIG. 5) provided in the right wall portion 51R.

Figure 16:
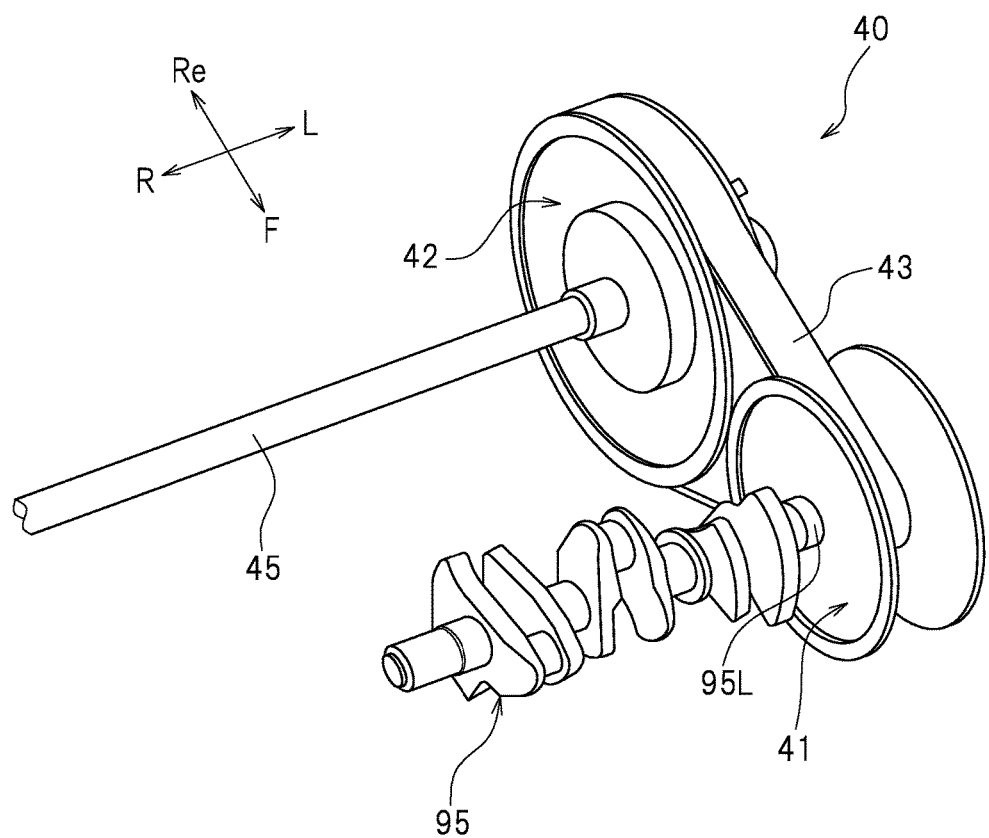
FIG. 16 is a perspective view showing a structure of a crankshaft and elements in the vicinity thereof according to a preferred embodiment of the present invention.

As shown in FIG. 2, a CVT 40 is located to the left of the engine 90. As shown in FIG. 16, the CVT 40 includes a driving pulley 41, a subordinate pulley 42, and a belt 43 wound along the driving pulley 41 and the subordinate pulley 42. The subordinate pulley 42 is located to the rear of the driving pulley 41. The crank shaft 95 is attached to a center of the driving pulley 41. The driving pulley 41 rotates together with the crank shaft 95. In FIG. 1 and FIG. 3 and FIG. 5, the CVT 40 is not shown.

As shown in FIG. 16, an output shaft 45 is attached to a center of the subordinate pulley 42. The subordinate pulley 42 is rotates together with the output shaft 45. The output shaft 45 extends in the vehicle width direction. The output shaft 45 rotates together with the crank shaft 95 via the CVT 40. An output gear (not shown) is secured to the output shaft 45.

As shown in FIG. 1, the propelling device 30 includes a driving wheel 31, a subordinate wheel 32, an endless track belt 33 wound along the driving wheel 31 and the subordinate wheel 32, and a driving shaft 35. The driving wheel 31 is secured to the driving shaft 35. The driving shaft 35 extends in the vehicle width direction. A driving shaft gear (not shown) is secured to the driving shaft 35. The driving shaft gear is in engagement with the output shaft gear. When the output shaft 45 is rotated, the power of the output shaft 45 is transmitted to the driving shaft 35 via the output shaft gear and the driving shaft gear, and thus the driving shaft 35 is rotated. The driving shaft 35 rotates together with the crank shaft 95. When the driving shaft 35 is rotated, the driving wheel 31 is rotated and the track belt 33 circulates. In other words, the track belt 33 is driven by the driving shaft 35. When the driving wheel 31 is rotated counterclockwise in FIG. 1, the track belt 33 circulates counterclockwise, and a forward propelling force is generated in the snowmobile 1. By contrast, when the driving wheel 31 is rotated clockwise in FIG. 1, the track belt 33 circulates clockwise, and a rearward propelling force is generated in the snowmobile 1. A mechanism that transmits the power from the output shaft 45 to the track belt 33 is not limited to a gear mechanism, and may be a transmission belt, a chain, or any other mechanism.

Figure 17:
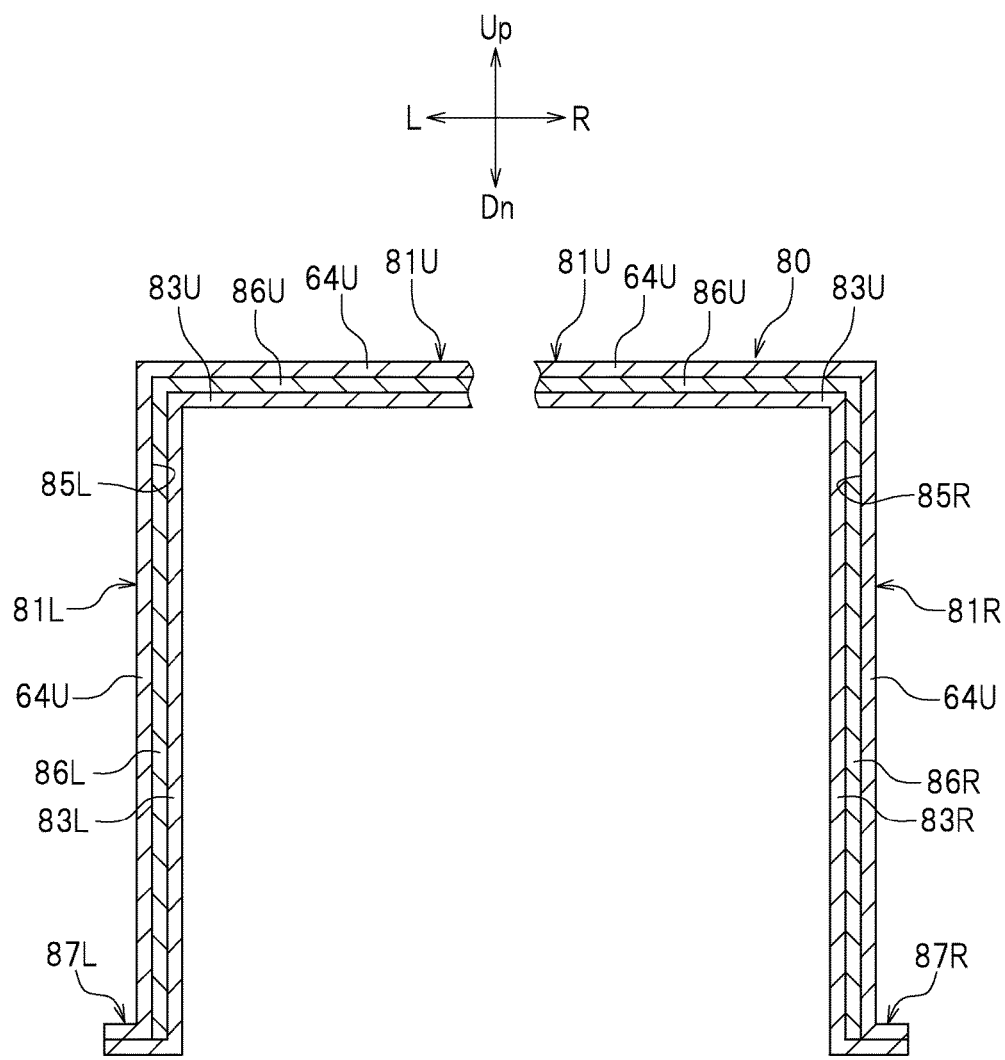
FIG. 17 is a cross-sectional view taken along line XVII-XVII in FIG. 5.

As shown in FIG. 4, the bottom vehicle body frame 62 includes the tunnel portion 80 and a bumper 82. The tunnel portion 80 extends in the vehicle front-rear direction. The bumper 82 is provided to the rear of the tunnel portion 80. The tunnel portion 80 and the bumper 82 are preferably integrally formed by molding so as to provide a single unitary member. The tunnel portion 80 may be formed by molding separately from the bottom vehicle body frame 62. The tunnel portion 80 is located above the track belt 33 (see FIG. 1). As shown in FIG. 17, the tunnel portion 80 includes a top wall 81U, a left side wall 81L and a right side wall 81R. The top wall 81U is located above the track belt 33 (see FIG. 1). The left side wall 81L extends downward from a left end of the top wall 81U. The left side wall 81L is located to the left of the track belt 33. The right side wall 81R extends downward from a right end of the top wall 81U. The right side wall 81L is located to the right of the track belt 33.

The top wall 81U, the left side wall 81L and the right side wall 81R are made of a carbon fiber-reinforced plastic material. As shown in FIG. 17, the top wall 81U, the left side wall 81L and the right side wall 81R include a CFRP layer 64U made of a carbon fiber-reinforced plastic material. The CFRP layer 64U includes at least two layers made of a carbon fiber-reinforced plastic material. The top wall 81U includes a top reinforcing member 83U that reinforces the CFRP layer 64U. The left side wall 81L includes a left reinforcing member 83L that reinforces the CFRP layer 64U. The right side wall 81R includes a right reinforcing member 83R that reinforces the CFRP layer 64U. The top reinforcing member 83U, the left reinforcing member 83L and the right reinforcing member 83R are made of a carbon fiber-reinforced plastic material. The tunnel portion 80 is provided with a first closed cross-section 85L. The first closed cross-section 85L is defined by being enclosed by the top reinforcing member 83U of the top wall 81U, the CFRP layer 64U of the left side wall 81L, and the left reinforcing member 83L. The tunnel portion 80 is provided with a second closed cross-section 85R. The second closed cross-section 85R is defined by being enclosed by the top reinforcing member 83U of the top wall 81U, the CFRP layer 64U of the right side wall 81R, and the right reinforcing member 83R. The first closed cross-section 85L and the second closed cross-section 85R are defined by being enclosed by the elements made of a carbon fiber-reinforced plastic material.

As shown in FIG. 17, a first reinforcing member 86L is located in the first closed cross-section 85L. The first reinforcing member 86L is located between the CFRP layer 64U and the left reinforcing member 83L. A second reinforcing member 86R is located in the second closed cross-section 85R. The second reinforcing member 86R is located between the CFRP layer 64U and the right reinforcing member 83R. A third reinforcing member 86U is located between the CFRP layer 64U of the top wall 81U and the top reinforcing member 83U. The first reinforcing member 86L, the second reinforcing member 86R and the third reinforcing member 86U are made of a carbon fiber-reinforced plastic material. The first reinforcing member 86L, the second reinforcing member 86R and the third reinforcing member 86U may be made of a fiber material such as aramid fiber or the like, a metal material such as aluminum or the like, or a resin material such as a urethane resin or the like. In the case of being made of a metal material or a resin material, the first reinforcing member 86L, the second reinforcing member 86R and the third reinforcing member 86U each preferably have a honeycomb structure. The first reinforcing member 86L, the second reinforcing member 86R and the third reinforcing member 86U may be made of the same material as, or different materials from, each other.

As shown in FIG. 17, the tunnel portion 80 includes a left wall 87L extending leftward from a bottom end of the left side wall 81L. The left wall 87L includes the CFRP layer 64U and the left reinforcing member 83L. In other words, a bottom end of the CFRP layer 64U and a bottom end of the left reinforcing member 83L of the left side wall 81L are bent leftward. The tunnel portion 80 includes a right wall 87R extending rightward from a bottom end of the right side wall 81R. The right wall 87R includes the CFRP layer 64U and the right reinforcing member 83R. In other words, a bottom end of the CFRP layer 64U and a bottom end of the right reinforcing member 83R of the right side wall 81R are bent rightward.

As shown in FIG. 2, the snowmobile 1 includes a left foot step 8L and a right foot step 8R that allow feet of the rider to be put thereon. The left foot step 8L is located to the left of the tunnel portion 80. The left foot step 8L is located to the left of the seat 3. The left foot step 8L is attached to the left wall 87L. The right foot step 8R is located to the right of the tunnel portion 80. The right foot step 8R is located to the right of the seat 3. The right foot step 8R is attached to the right wall 87R. In FIG. 1, FIG. 3, FIG. 5 and FIG. 11, the left foot step 8L and the right foot step 8R are not shown. The top wall 81U, the left side wall 81L and the right side wall 81R of the tunnel portion 80 may be made of a metal material.

As described above, in the snowmobile 1 in this preferred embodiment, referring to FIG. 2, the top wall portion 51U, the left wall portion 51L, the right wall portion 51R and the bottom wall portion 51B of the wall portion 51 defining the engine room 51E are made of a carbon fiber-reinforced plastic material. This increases the strength and the rigidity of the engine room 51E. The left wall portion 51L and the right wall portion 51R made of the carbon fiber-reinforced plastic material overlap the engine 90 as seen in a side view. The top wall portion 51U and the bottom wall portion 51B overlap the engine 90 as seen in a plan view. Therefore, snow directed toward the engine 90 from the outside of the engine 90 falls on the top wall portion 51U, the left wall portion 51L, the right wall portion 51R and the bottom wall portion 51B, and thus is prevented from falling on the engine 90.

In the snowmobile 1 in this preferred embodiment, as shown in FIG. 9, the left wall portion 51L and the right wall portion 51R defining the engine room 51E (see FIG. 1) each include the first layer 64 and the second layer 66 that are made of a carbon fiber-reinforced plastic material and also the intermediate layer 65 located between the first layer 64 and the second layer 66. This further increases the strength and the rigidity of the engine room 51E.

In the snowmobile 1 in this preferred embodiment, the top wall portion 51U is made of a carbon fiber-reinforced plastic material, which is highly rigid. Therefore, as shown in FIG. 11, the top wall portion 51U supports the steering shaft 5, and also supports the bottom vehicle body frame 62 with the first left support portion 55L, the first right support portion 55R, the second left support portion 56L and the second right support portion 56R. The top wall portion 51U also prevents the engine 90 from being exposed to snow directed thereto from above the engine 90.

In the snowmobile 1 in this preferred embodiment, referring to FIG. 12 and FIG. 13, the top wall portion 51U is made of a carbon fiber-reinforced plastic material, which is highly rigid. Therefore, the top wall portion 51U supports the steering shaft 5 at two points, i.e., the first shaft support portion 53A and the second shaft support portion 53B. This allows the top wall portion 51U to support the steering shaft 5 more stably.

The top vehicle body frame 52 and the bottom vehicle body frame 62 may preferably be integrally formed by molding so as to provide a single unitary member. This decreases the number of components used to connect the top vehicle body frame 52 and the bottom vehicle body frame 62 to each other, and decreases the weight of the snowmobile 1 because of the decrease in the number of components.

In the snowmobile 1 in this preferred embodiment, as shown in FIG. 2, the left wall portion 51L supports the engine 90 with the first left engine support portion 63LA (see FIG. 5) and supports the first left arm 18L with the two first left arm connection portions 72L. The right wall portion 51R supports the engine 90 with the first right engine support portion 63RA (see FIG. 5) and supports the first right arm 18R with the two first right arm connection portions 72R. The left wall portion 51L and the right wall portion 51R prevent the engine 90 from being exposed to snow directed thereto from the left and the right of the engine 90.

In the snowmobile 1 in this preferred embodiment, as shown in FIG. 6, the second left engine support portion 63LB includes the intermediate layer 65 provided therein. This increases the strength and the rigidity of the second left engine support portion 63LB.

Figure 18:
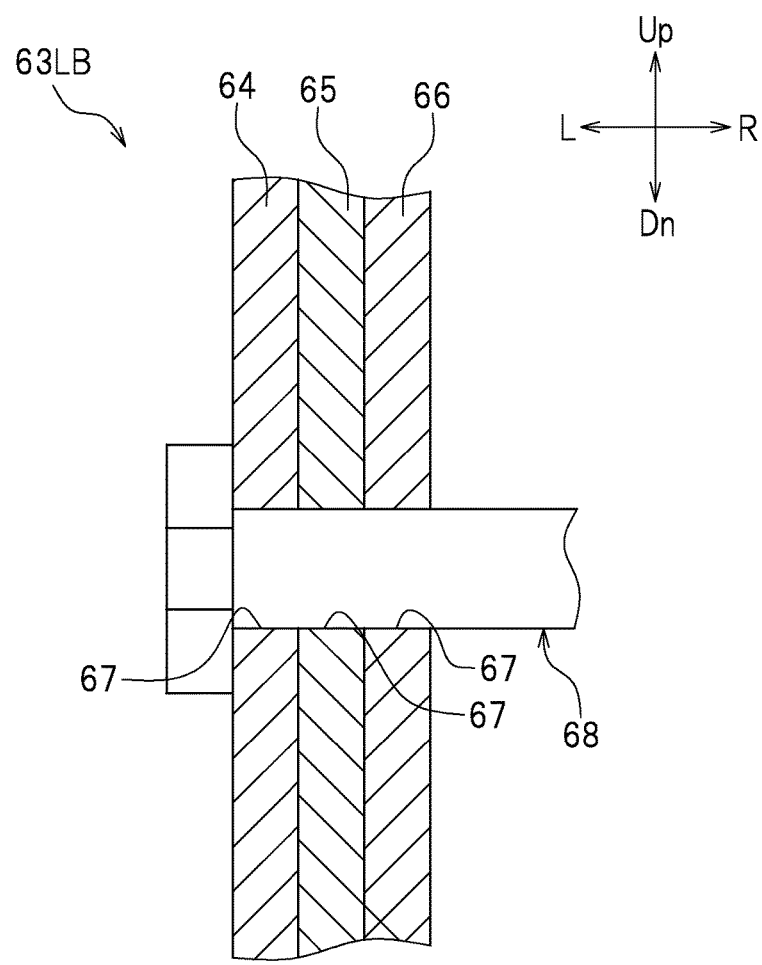
FIG. 18 is a cross-sectional view showing a structure of an engine support portion according to a modification of a preferred embodiment of the present invention.

In the above preferred embodiment, the pipe 69 is provided in the through-hole 67 in the first layer 64, the intermediate layer 65 and the second layer 66 of the second left engine support portion 63LB, and the securing member 68 is inserted into the through-hole 67 via the pipe 69. The present invention is not limited to having such a structure. As shown in FIG. 18, the securing member 68 may be directly inserted into the through-hole 67 with no pipe being provided in the through-hole 67.

Figure 19:
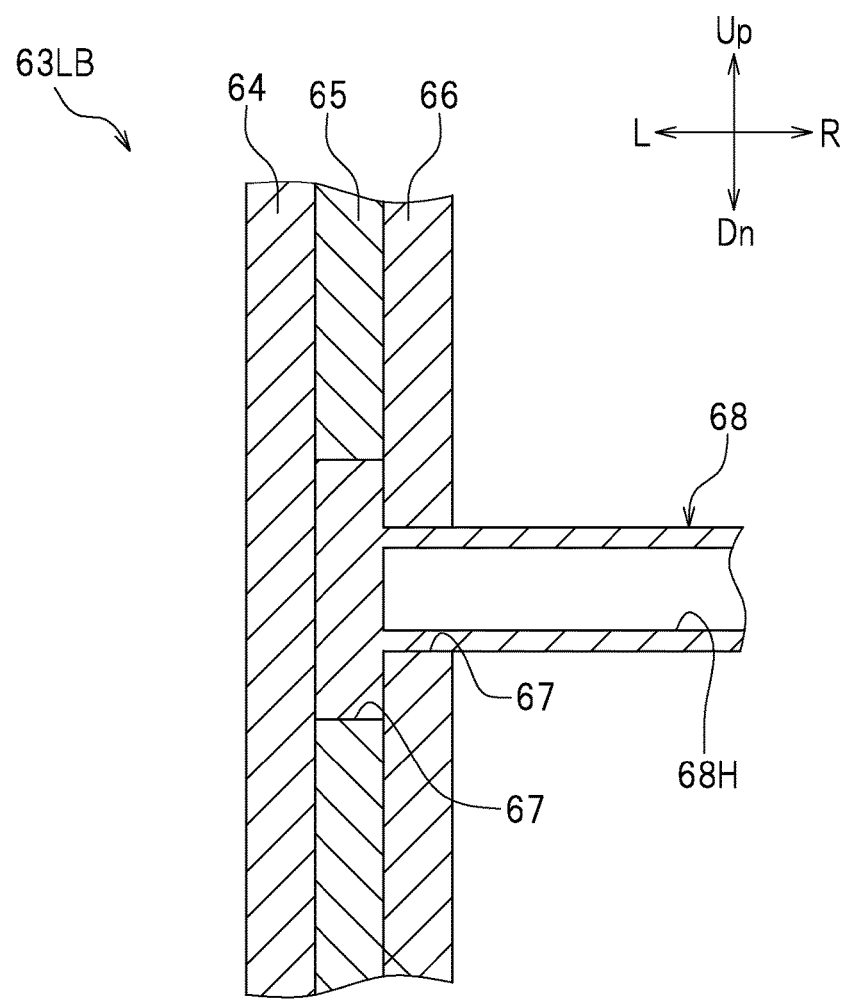
FIG. 19 is a cross-sectional view showing a structure of an engine support portion according to another modification of a preferred embodiment of the present invention.

Alternatively, as shown in FIG. 19, the securing member 68 may be provided in the through-hole 67 in the intermediate layer 65 and the through-hole 67 in the second layer 66. In this case, the securing member 68 is provided on the second left engine support portion 63LB preferably by insert molding, for example. The securing member 68 is provided with an insertion hole 68H extending in an axial direction of the securing member 68. Another member may be inserted into the insertion hole 68H, so that the another member and the securing member 68 are secured to each other.

Figure 20:
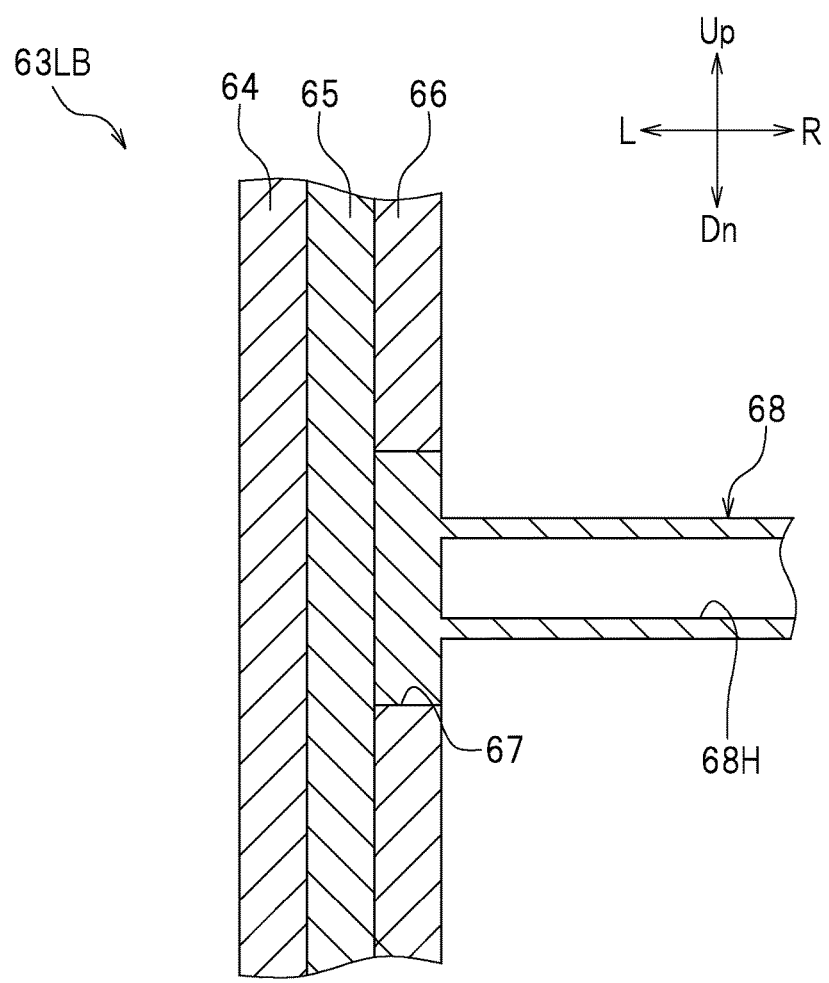
FIG. 20 is a cross-sectional view showing a structure of an engine support portion according to still another modification of a preferred embodiment of the present invention.

Still alternatively, as shown in FIG. 20, the securing member 68 may be provided in the through-hole 67 in the second layer 66. In this case, the securing member 68 may be provided on the second layer 66 by insert molding or with an adhesive or the like. The securing member 68 is provided with the insertion hole 68H extending in the axial direction of the securing member 68. Another member may be inserted into the insertion hole 68H, so that the another member and the securing member 68 are secured to each other.

Figure 21:
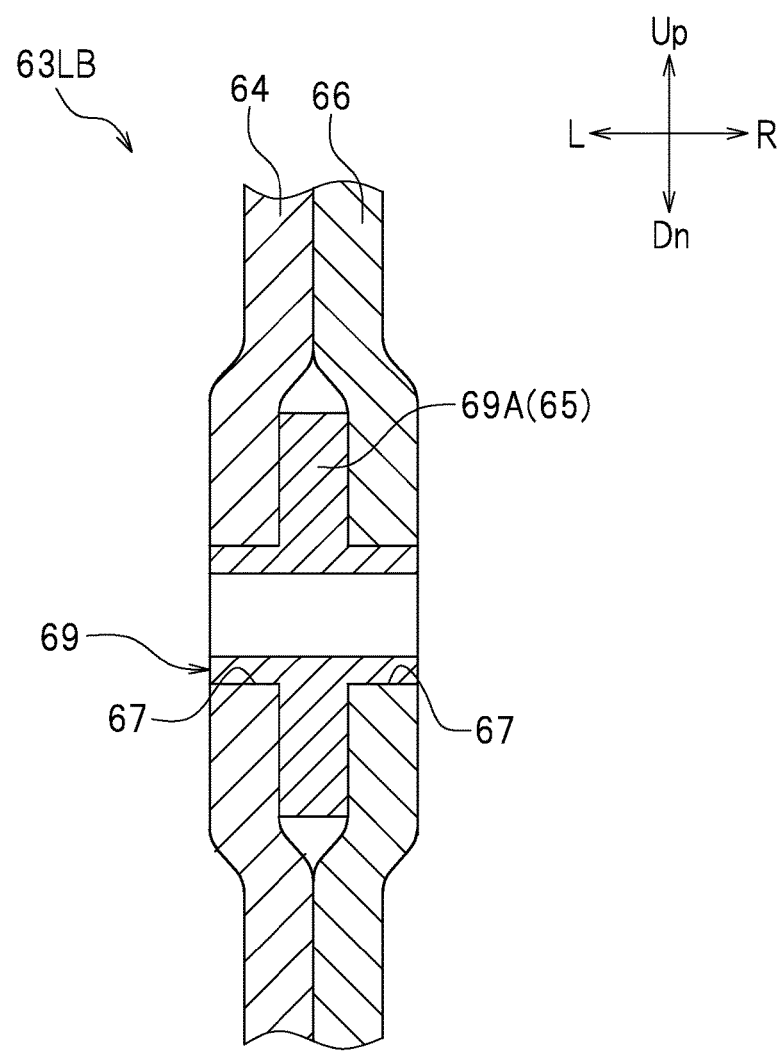
FIG. 21 is a cross-sectional view showing a structure of an engine support portion according to still another modification of a preferred embodiment of the present invention.

In the above-described preferred embodiment and modifications, the intermediate layer 65 located between the first layer 64 and the second layer 65 includes a layer made of a carbon fiber-reinforced plastic material. The present invention is not limited to having such a structure. As shown in FIG. 21, a portion 69A of the pipe 69 inserted into the through-hole 67 in the first layer 64 and the through-hole 67 in the second layer 66 may be located between the first layer 64 and the second layer 66. In this structure, the portion 69A of the pipe 69 is the intermediate layer 65. The intermediate layer 65 is a metal layer made of a metal material.

Second Preferred Embodiment

Figure 22:
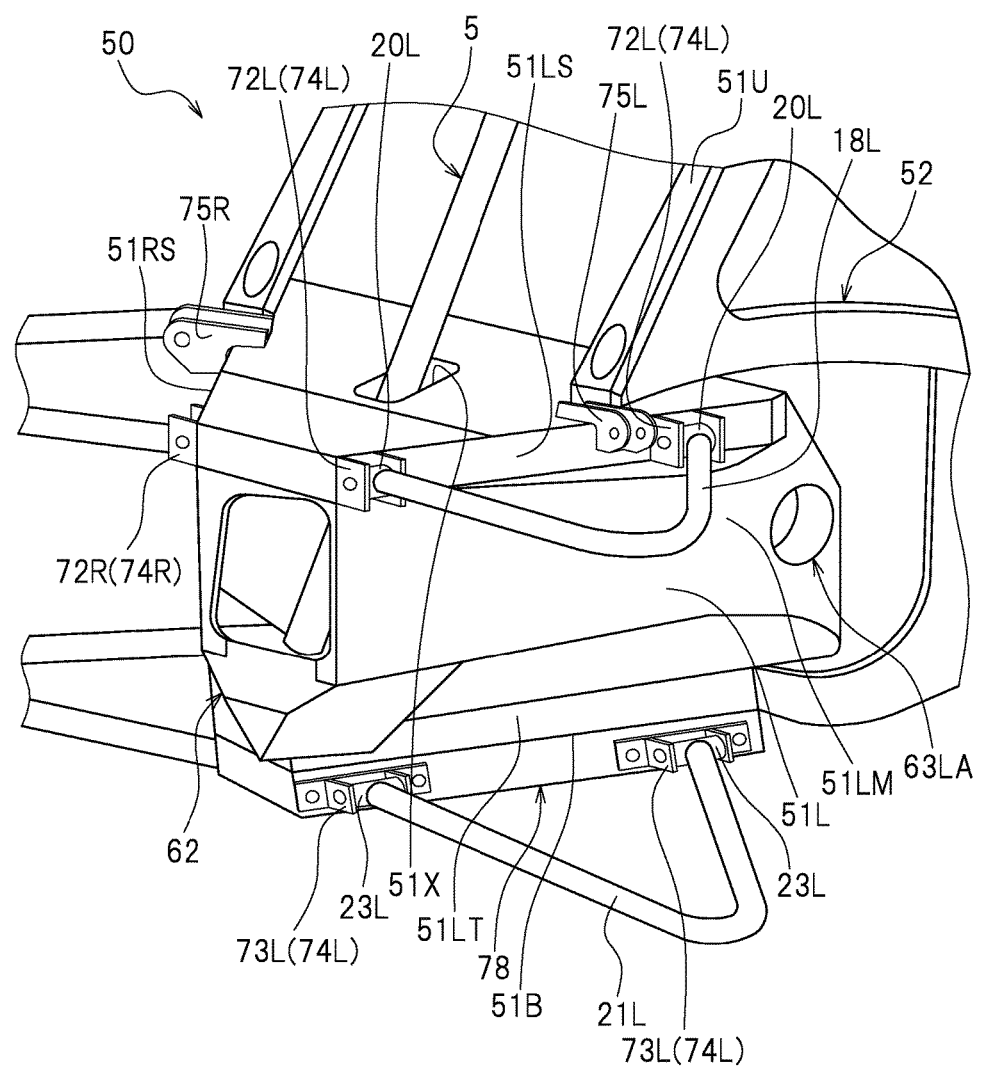
FIG. 22 is a perspective view showing a structure of a left arm and elements in the vicinity thereof according to another preferred embodiment of the present invention.

In the above-described preferred embodiment, the second left arm connection portions 73L preferably are provided on the left wall portion 51L of the bottom vehicle body frame 62, and the second right arm connection portions 73R preferably are provided on the right wall portion 51R of the bottom vehicle body frame 62. The present invention is not limited to having such a structure. As shown in FIG. 22, the snowmobile 1 according to a second preferred embodiment of the present invention includes a protection member 78. The protection member 78 is located below the bottom vehicle portion 51B. The protection member 78 is detachably attached to the bottom vehicle portion 51B. The protection member 78 protects the bottom vehicle portion 51B. The protection member 78 covers the entirety of the bottom vehicle portion 51B. It is sufficient that the protection member 78 covers at least a portion of the bottom vehicle portion 51B. The protection member 78 is made of a metal material. The protection member 78 may be made of a resin material. In this preferred embodiment, the second left arm connection portions 73L and the second right arm connection portions (not shown) are provided on the protection member 78.

In the snowmobile 1 in this preferred embodiment, the protection member 78 located below the bottom wall portion 51B as shown in FIG. 22 prevents abrasion of the bottom wall portion 51B caused by the bottom wall portion 51B contacting the ground while the snowmobile 1 is running. The protection member 78 also prevents the engine 90 from being exposed to snow directed thereto from below the engine 90.

In the snowmobile 1 in this preferred embodiment, referring to FIG. 22, the protection member 78 prevents abrasion of the bottom wall portion 51B caused by the bottom wall portion 51B contacting the ground while the snowmobile 1 is running. The protection member 78 better prevents the engine 90 from being exposed to snow directed thereto from below the engine 90.

In the snowmobile 1 in this preferred embodiment, referring to FIG. 22, the protection member 78, which is made of a metal material or a resin material, is more highly abrasion-resistant than a protection member made of a carbon fiber-reinforced plastic material, and therefore better protects the bottom wall portion 51B. In the case of being made of a metal material, the protection member 78 protects the bottom wall portion 51B against an impact that may be applied from the ground on the bottom wall portion 51B. In the case where the protection member 78 is made of a resin material, an increase in the weight of the bottom vehicle body frame 62 is prevented.

Third Preferred Embodiment

Figure 23:
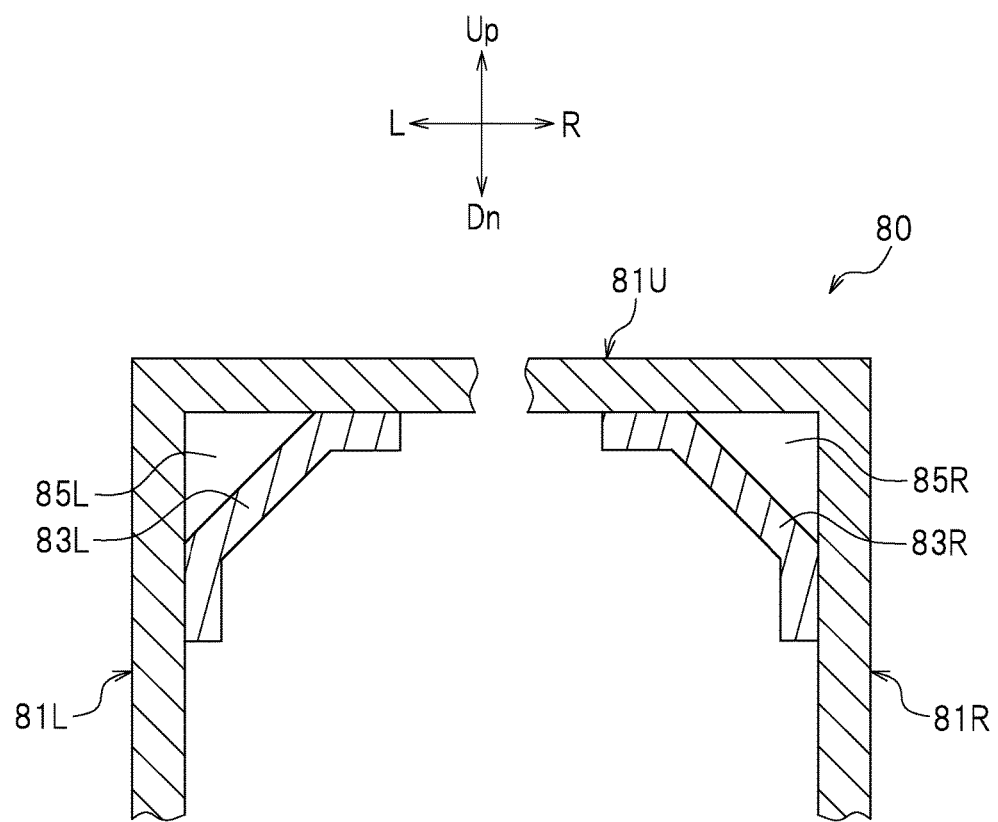
FIG. 23 is a cross-sectional view showing a structure of a tunnel portion according to still another preferred embodiment of the present invention.
Figure 24:
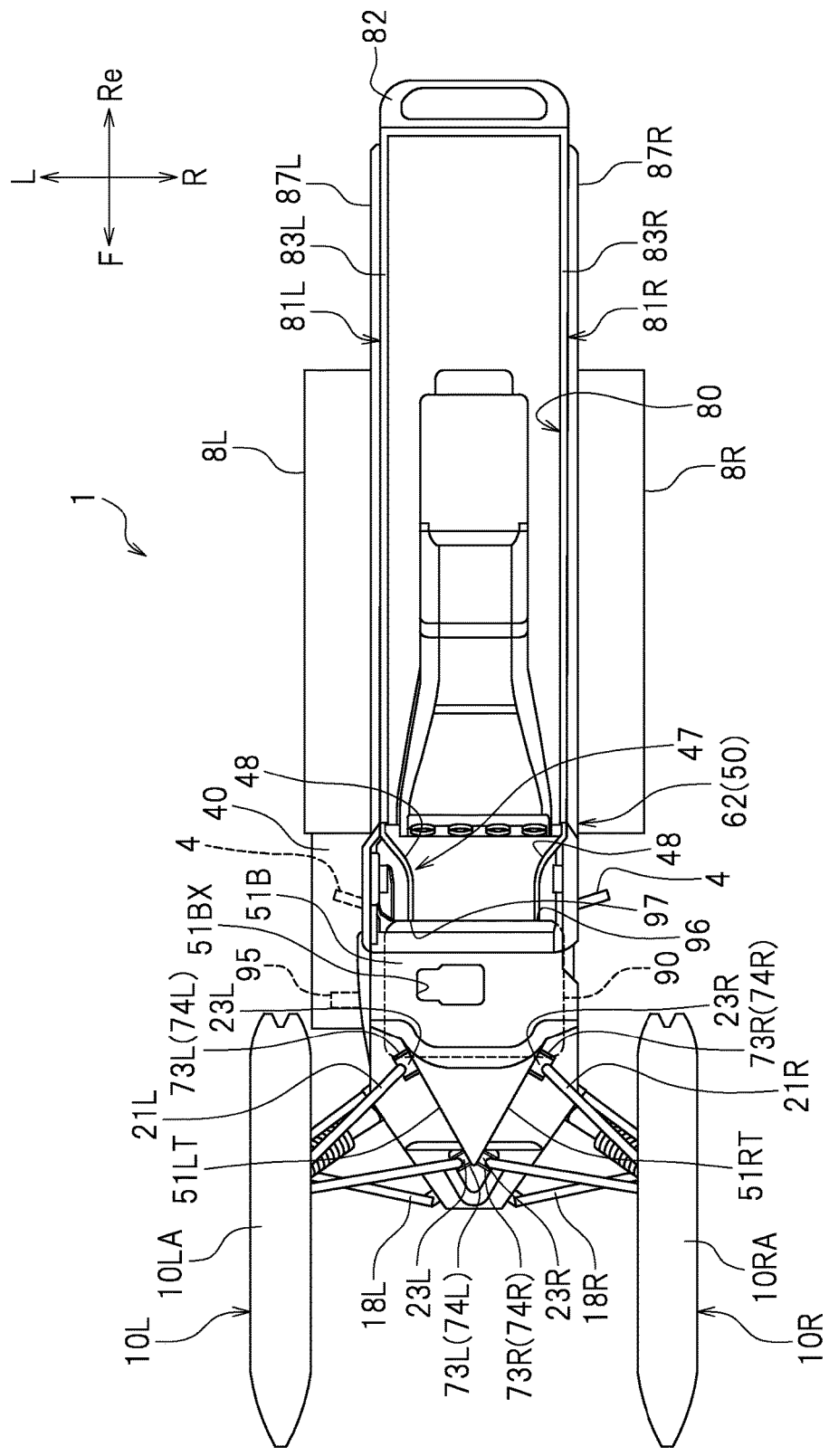
FIG. 24 is a bottom view of the snowmobile according to the still another preferred embodiment of the present invention.

FIG. 23 is a cross-sectional view showing a structure of a tunnel portion 80 according to a third preferred embodiment of the present invention. FIG. 24 is a bottom view of a snowmobile 1 according to the third preferred embodiment. As shown in FIG. 23, the tunnel portion 80 includes a top wall 81U, a left side wall 81L and a right side wall 81R. The top wall 81U, the left side wall 81L and the right side wall 81R are made of a carbon fiber-reinforced plastic material. The tunnel portion 80 includes a left reinforcing member 83L that reinforces the left side wall 81L and a right reinforcing member 83R that reinforces the right side wall 81R. The left reinforcing member 83L and the right reinforcing member 83R are made of a carbon fiber-reinforced plastic material. The left reinforcing member 83L is connected to the top wall 81U and the left side wall 81L. The left reinforcing member 83L extends obliquely downward and leftward from the top wall 81U to the left side wall 81L. The left reinforcing member 83L is located below the top wall 81U and between the left side wall 81L and the right side wall 81R. The left reinforcing member 83L is located inward of the tunnel portion 80. The left reinforcing member 83L may be located outward of the tunnel portion 80. The right reinforcing member 83R is connected to the top wall 81U and the right side wall 81R. The right reinforcing member 83R extends obliquely downward and rightward from the top wall 81U to the right side wall 81R. The right reinforcing member 83R is located below the top wall 81U and between the left side wall 81L and the right side wall 81R. The right reinforcing member 83R is located inward of the tunnel portion 80. The right reinforcing member 83R may be located outward of the tunnel portion 80. As shown in FIG. 24, the left reinforcing member 83L extends in the vehicle front-rear direction. The right reinforcing member 83R extends in the vehicle front-rear direction.

As shown in FIG. 23, the tunnel portion 80 is provided with a first closed cross-section 85L defined by the top wall 81U, the left side wall 81L and the left reinforcing member 83L. The tunnel portion 80 is provided with a second closed cross-section 85R defined by the top wall 81U, the right side wall 81R and the right reinforcing member 83R. The first closed cross-section 85L and the second closed cross-section 85R are defined by the components made of a carbon fiber-reinforced plastic material.

As shown in FIG. 24, the snowmobile 1 includes a cooling device 47 that supplies cooling water to the engine 90. The cooling device 47 includes a flow path 48 through which the cooling water flows. One of two ends of the flow path 48 is connected to an inlet 96 provided in the engine 90. The other end of the flow path 48 is connected to an outlet 97 provided in the engine 90. The first closed cross-section 85L (see FIG. 23) and the second closed cross-section 85R (see FIG. 23) define a portion of the flow path 48. In other words, a portion of the flow path 48 is defined by being enclosed by the top wall 81U, the left side wall 81L and the left reinforcing member 83L. Another portion of the flow path 48 is defined by being enclosed by the top wall 81U, the right side wall 81R and the right reinforcing member 83R. In this preferred embodiment, the cooling water flows in the first closed cross-section 85L and the second closed cross-section 85R. The cooling water flowing in the flow path 48 is supplied from the inlet 96 of the engine 90 into the engine 90, and after circulating in the engine 90, flows from the outlet 97 of the engine 90 into the flow path 48. In this manner, the cooling water circulates in the engine 90 and the flow path 48.

It is preferable that the carbon fiber-reinforced plastic material used to define the left reinforcing member 83L and the right reinforcing member 83R has a heat conductivity higher than that of the carbon fiber-reinforced plastic material used to form the top wall 81U, the left side wall 81L and the right side wall 81R. The top wall 81U, the left side wall 81L and the right side wall 81R are preferably made of a carbon fiber-reinforced plastic material containing a PAN-based carbon fiber material. The "PAN-based carbon fiber material" is a carbon fiber material obtained by carbonizing a polyacrylonitrile fiber material. The left reinforcing member 83L and the right reinforcing member 83R are preferably made of a carbon fiber-reinforced plastic material containing, for example, a PIT-based carbon fiber material. The "PIT-based carbon fiber material" is a carbon fiber material obtained by carbonizing a pitch fiber material that is obtained by use of coal tar or heavy petroleum distillate as a material.

Fourth Preferred Embodiment

Figure 25:
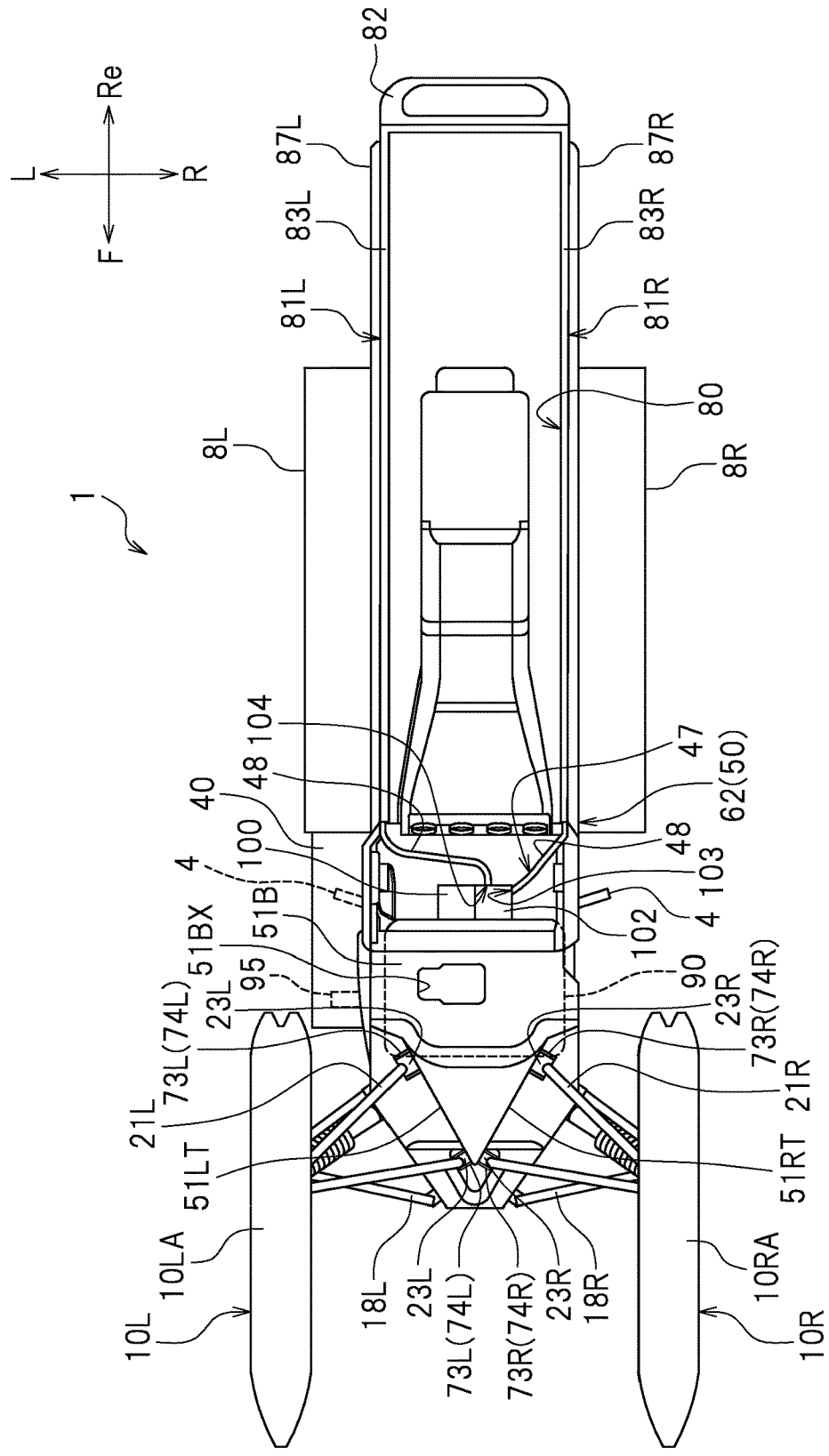
FIG. 25 is a bottom view of a snowmobile according to still another preferred embodiment of the present invention.

FIG. 25 is a bottom view of a snowmobile 1 according to a fourth preferred embodiment of the present invention. As shown in FIG. 25, the snowmobile 1 includes a supercharger 100 that compresses air to be supplied to the engine 90, an intercooler 102 that cools the compressed air from the supercharger 100 and supplies the compressed air to the engine 90, and a cooling device 47 that supplies air to the intercooler 102. The cooling device 47 includes a flow path 48 in which air flows. The intercooler 102 includes a cooling unit (not shown) provided therein. Air that is compressed by the supercharger 100 is cooled by the cooling unit in the intercooler 102. One of two ends of the flow path 48 is connected to an inlet 103 provided in the intercooler 102. The other end of the flow path 48 is connected to an outlet 104 provided in the intercooler 102. The first closed cross-section 85L (see FIG. 23) and the second closed cross-section 85R (see FIG. 23) define a portion of the flow path 48. More specifically, a portion of the flow path 48 is defined by being enclosed by the top wall 81U, the left side wall 81L and the left reinforcing member 83L. Another portion of the flow path 48 is defined by being enclosed by the top wall 81U, the right side wall 81R and the right reinforcing member 83R. In this preferred embodiment, air flows in the first closed cross-section 85L and the second closed cross-section 85R. The air flowing in the flow path 48 is supplied from the inlet 103 of the intercooler 102 into the cooling unit in the intercooler 102, and after circulating in the cooling unit, flows from the outlet 104 of the intercooler 102 into the flow path 48. In this manner, the air circulates in the cooling unit in the intercooler 102 and the flow path 48.

Fifth Preferred Embodiment

Figure 26:
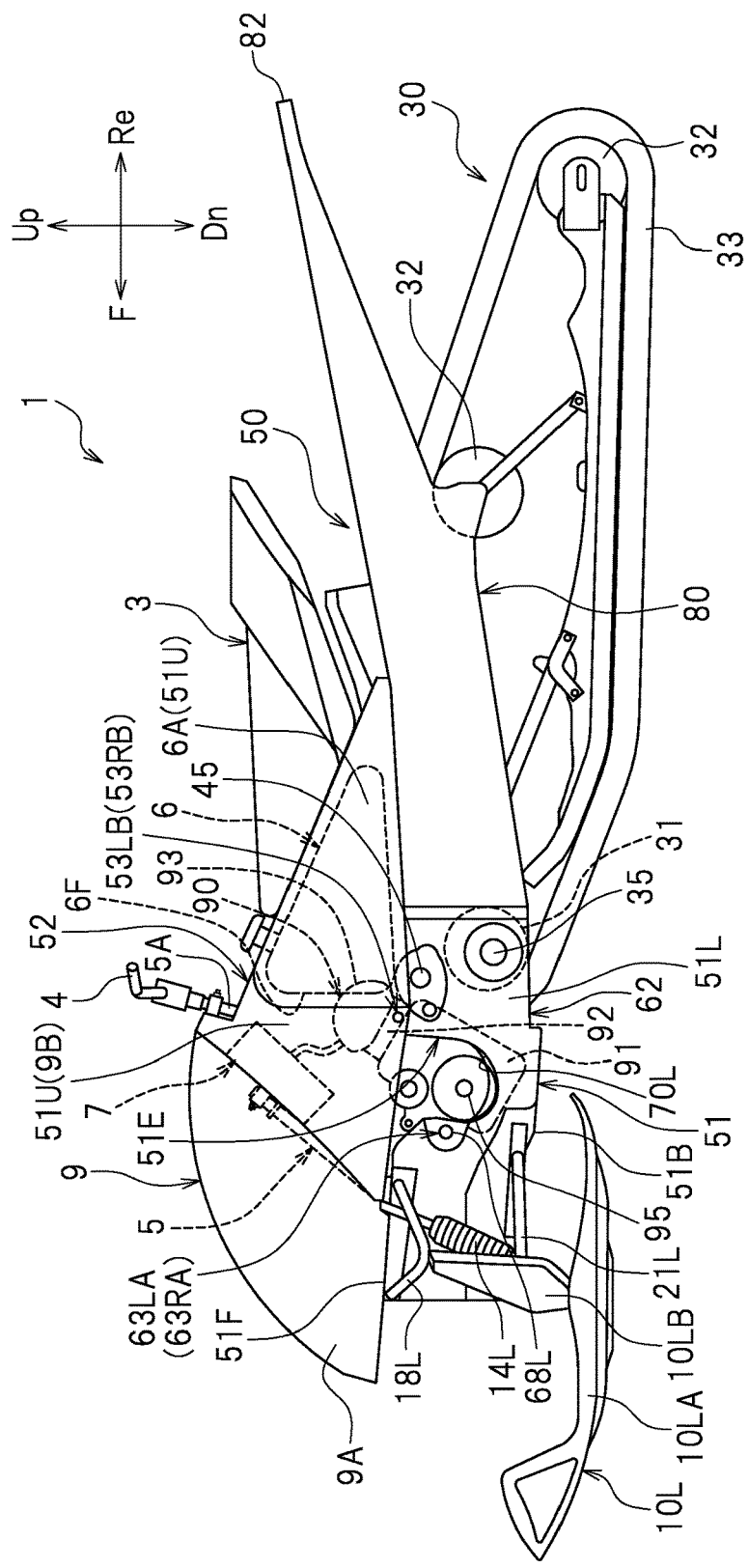
FIG. 26 is a left side view of a snowmobile according to still another preferred embodiment of the present invention.
Figure 27:
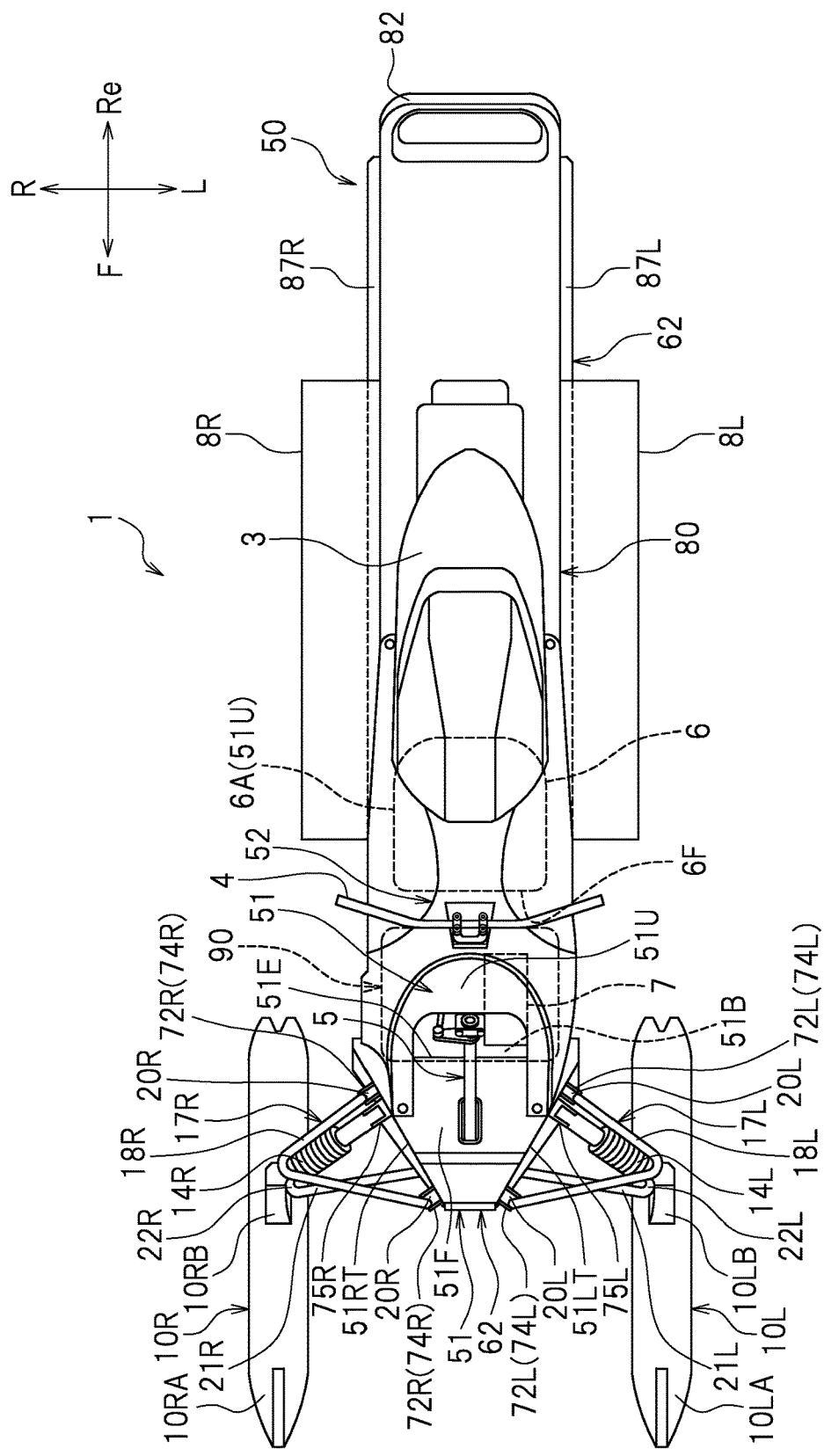
FIG. 27 is a plan view of the snowmobile according to the still another preferred embodiment of the present invention.
Figure 28:
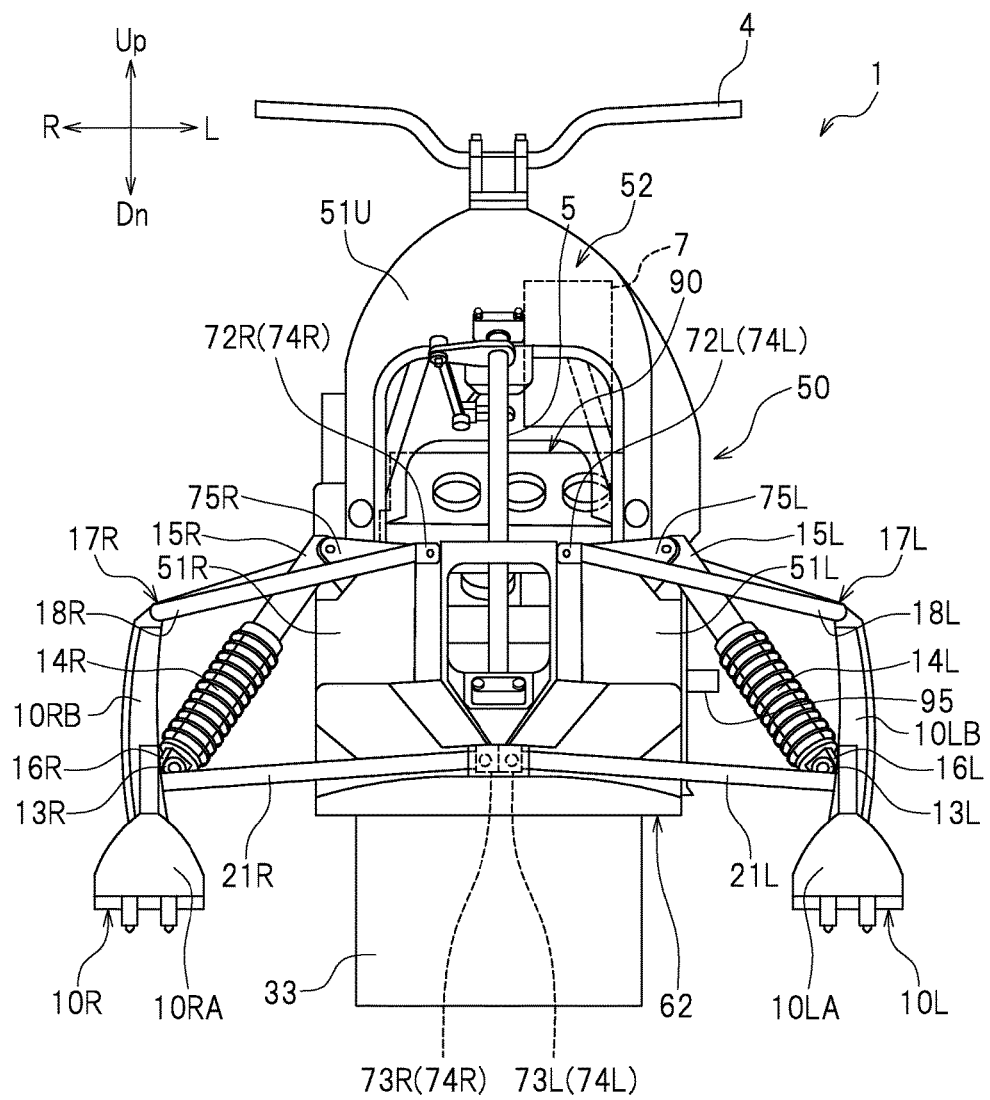
FIG. 28 is a front view of the snowmobile according to the still another preferred embodiment of the present invention.

FIG. 26 is a left side view of a snowmobile 1 according to a fifth preferred embodiment of the present invention. FIG. 27 is a plan view of the snowmobile 1 according to the fifth preferred embodiment. FIG. 28 is a front view of the snowmobile 1 according to the fifth preferred embodiment. In FIG. 27 and FIG. 28, a vehicle body cover 9 is not shown. As shown in FIG. 26, the snowmobile 1 includes a vehicle body frame 50. The vehicle body frame 50 includes a top vehicle body frame 52 and a bottom vehicle body frame 62. The top vehicle body frame 52 and the bottom vehicle body frame 62 may be integrally formed by molding, for example, so as to provide a single unitary member. The top vehicle body frame 52 includes a top wall portion 51U located above the engine 90. The top wall portion 51U defines and functions as a seat frame that supports the seat 3. The seat 3 is supported by the top wall portion 51U.

As shown in FIG. 26, the snowmobile 1 includes a fuel tank 6 and a fuel tank cover 6A that covers the fuel tank 6. The fuel tank 6 is covered with the top vehicle body frame 52. The fuel tank 6 is supported by the top wall portion 51U. As shown in FIG. 27, the fuel tank 6 is located to the rear of the engine 90. The fuel tank 6 is located above the bottom vehicle body frame 62. A front end 6F of the fuel tank 6 is located to the front of the seat 3. The fuel tank cover 6A is located to cover the fuel tank 6. The top wall portion 51U defines a portion of the fuel tank cover 6A.

As shown in FIG. 28, the snowmobile 1 includes an air suction silencer 7 that supplies air to the engine 90. As shown in FIG. 26, the air suction silencer 7 is located to the front of the front tank 6. The air suction silencer 7 is located above the bottom vehicle body frame 62. The air suction silencer 7 is located to the front of the handle 4. The top wall portion 51U defines a portion of the air suction silencer 7.

As shown in FIG. 26, the snowmobile 1 includes a vehicle body cover 9 located outward of the engine 90. The vehicle body cover 9 includes a front vehicle body cover 9A located to the front of the top vehicle body frame 52 and a rear vehicle body cover 9B defined by at least a portion of the top vehicle body frame 52. At least portions of the top vehicle body frame 52 that are located to the left and to the right of the engine 90 are included in the rear vehicle body cover 9B. The portions of the top vehicle body frame 52 that are located to the left and to the right of the engine 90 are exposed outside. In other words, a separate vehicle body cover is not provided outward of the portions of the top vehicle body frame 52 that are located to the left and to the right of the engine 90. The top vehicle body frame 52 and the front vehicle body cover 9A preferably are separately formed by molding.

As shown in FIG. 26, the bottom vehicle body frame 62 includes a first left engine support portion 63LA and a first right engine support portion 63RA. The top vehicle body frame 52 includes a second left engine support portion 53LB and a second right engine support portion 53RB. The second left engine support portion 53LB and the second right engine support portion 53RB are formed in the top wall portion 51U. The second left engine support portion 53LB and the second right engine support portion 53RB support the engine 90. The first left engine support portion and the first right engine support portion may be provided in the top wall portion 51U.

In the snowmobile 1 in this preferred embodiment, as shown in FIG. 26, the seat 3 is supported by the top wall portion 51U. Therefore, a seat rail does not need to be separately provided to support the seat 3. This simplifies the structure and decreases the number of components and the cost.

In the snowmobile 1 in this preferred embodiment, as shown in FIG. 26, at least a portion of the fuel tank cover 6A that covers the fuel tank 6 is defined by the top wall portion 51. This simplifies the structure and decreases the number of components and the cost.

In the snowmobile 1 in this preferred embodiment, as shown in FIG. 26, a portion of the air suction silencer 7 is defined by the top wall portion 51U. This simplifies the structure and decreases the number of components and the cost.

In the snowmobile 1 in this preferred embodiment, as shown in FIG. 26, the rear vehicle body cover 9B is defined by the top wall portion 51U of the top vehicle body frame 52. This simplifies the structure and decreases the number of components and the cost.

In the snowmobile 1 in this preferred embodiment, as shown in FIG. 26, the second left engine support portion 53LB and the second right engine support portion 53RB are provided in the top wall portion 51U of the top vehicle body frame 52. This further simplifies the structure of the bottom vehicle body frame 62.

Sixth Preferred Embodiment

Figure 29:
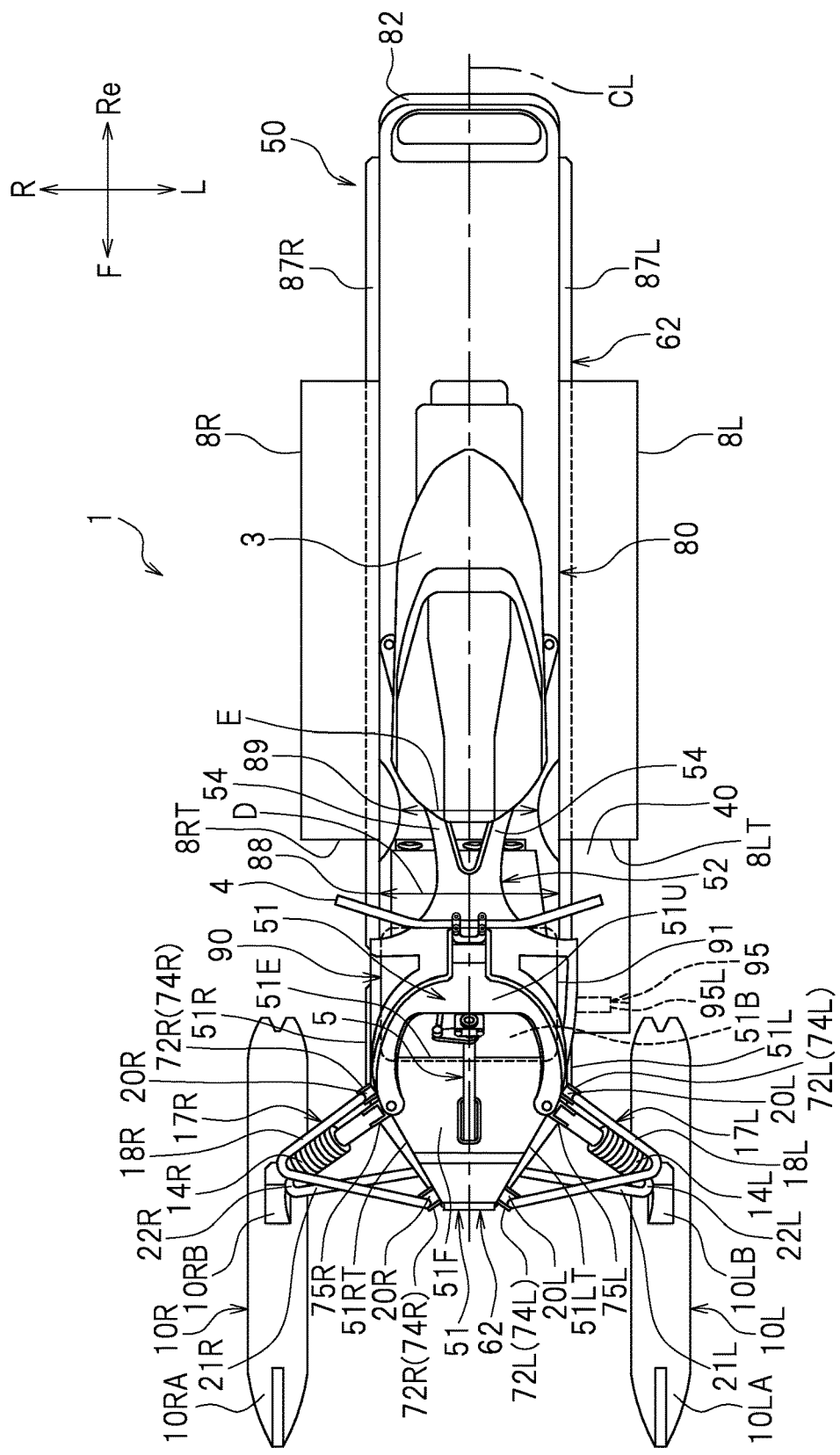
FIG. 29 is a plan view of a snowmobile according to still another preferred embodiment of the present invention.

FIG. 29 is a plan view of a snowmobile 1 according to a sixth preferred embodiment of the present invention. As shown in FIG. 29, the tunnel portion 80 includes a fourth portion 88 located to the rear of the engine 90, and a fifth portion 89 located to the rear of the fourth portion 88 and to the front of the seat 3. The tunnel portion 80 is recessed inward in the vehicle width direction in the fifth portion 89. Size E of the fifth portion 89 in the vehicle width direction is smaller than size D of the fourth portion 88 in the vehicle width direction. Size E of the fifth portion 89 in the vehicle width direction is smallest among the sizes of the various portions of the tunnel portion 80 in the vehicle width direction. Size D and size E in the vehicle width direction are each a length in the vehicle left-right direction from the left side wall 81L (see FIG. 17) to the right side wall 81R (see FIG. 17). The fifth portion 89 is located to the rear of a tip 8LT of the left foot step 8L and a tip 8RT of the right foot step 8R. The left side wall 81L and the right side wall 81R of the tunnel portion 80 are made of a carbon fiber-reinforced plastic material, and therefore recessed portions recessed inward in the vehicle with direction such as in the fifth portion 89 or the like, are easily provided in the tunnel portion 80.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of numerous and various preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A snowmobile comprising:
   an engine including a crankshaft;
   a driving shaft rotatable together with the crankshaft;
   an endless track belt drivable by the driving shaft; and
   a vehicle body frame including a wall portion that defines an engine room that accommodates the engine and an engine support portion that supports the engine; wherein
   at least a portion of the engine room and the engine support portion including the wall portion is made of a carbon fiber-reinforced plastic material, and the portion made of the carbon fiber-reinforced plastic material overlaps the engine as seen in a side view.

2. The snowmobile according to claim 1, wherein at least a portion of the wall portion includes a first layer made of at least a carbon fiber-reinforced plastic material and a second layer made of a carbon fiber-reinforced plastic material.

3. The snowmobile according to claim 1, wherein the portion of the wall portion that is made of the carbon fiber-reinforced plastic material includes a reinforcing member provided therein.

4. A snowmobile comprising:
   an engine including a crankshaft;
   a driving shaft rotatable together with the crankshaft;
   an endless track belt drivable by the driving shaft;
   a vehicle body frame including a wall portion that defines an engine room that accommodates the engine and an engine support portion that supports the engine; and
   a protection member; wherein
   at least a portion of the engine room and the engine support portion including the wall portion is made of a carbon fiber-reinforced plastic material, and the portion made of the carbon fiber-reinforced plastic material overlaps the engine as seen in a plan view;
   the wall portion includes a bottom wall portion located below the engine and made of a carbon fiber-reinforced plastic material; and
   the protection member is located below the bottom wall portion and protects the bottom wall portion.

5. The snowmobile according to claim 4, wherein the protection member covers an entirety of the bottom wall portion.

6. The snowmobile according to claim 4, wherein the protection member is made of a metal material or a resin material.

7. A snowmobile comprising:
   an engine including a crankshaft;
   a driving shaft rotatable together with the crankshaft;
   an endless track belt drivable by the driving shaft;
   a vehicle body frame including a wall portion that defines an engine room that accommodates the engine and an engine support portion that supports the engine; and
   a steering shaft secured to a handle; wherein
   at least a portion of the wall portion is made of a carbon fiber-reinforced plastic material and overlaps the engine as seen in at least a plan view or a side view;
   the vehicle body frame includes a top vehicle body frame and a bottom vehicle body frame located below the top vehicle body frame;
   the wall portion includes a top wall portion located above the engine and made of a carbon fiber-reinforced plastic material, the top wall portion defining a portion of the top vehicle body frame; and
   the top wall portion supports the steering shaft and supports the bottom vehicle body frame at least at two points.

8. The snowmobile according to claim 7, wherein the top wall portion supports the steering shaft at two points.

9. The snowmobile according to claim 7, further comprising a seat supported by the top wall portion.

10. The snowmobile according to claim 7, further comprising:
    a fuel tank covered by the top vehicle body frame; and
    a fuel tank cover that covers the fuel tank; wherein
    the top wall portion defines at least a portion of the fuel tank cover.

11. The snowmobile according to claim 7, further comprising:
    an air suction silencer that supplies air to the engine; wherein
    the top wall portion defines a portion of the air suction silencer.

12. The snowmobile according to claim 7, further comprising:
a vehicle body cover located outward of the engine; wherein
at least a portion of the top vehicle body frame defines a portion of the vehicle body cover.

13. The snowmobile according to claim 7, wherein the engine support portion is provided in the top wall portion.

14. The snowmobile according to claim 7, wherein the top vehicle body frame and the bottom vehicle body frame are integral with each other and defined by a single unitary member.

15. A snowmobile comprising:
an engine including a crankshaft;
a driving shaft rotatable together with the crankshaft;
an endless track belt drivable by the driving shaft;
a vehicle body frame including a wall portion that defines an engine room that accommodates the engine and an engine support portion that supports the engine;
a left ski located to the front of the engine;
a right ski located to the front of the engine and to the right of the left ski;
a left arm connected to the left ski; and
a right arm connected to the right ski; wherein
at least a portion of the wall portion is made of a carbon fiber-reinforced plastic material and overlaps the engine as seen in at least a plan view or a side view;
the wall portion includes a left wall portion located to the left of the engine and made of a carbon fiber-reinforced plastic material and a right wall portion located to the right of the engine and made of a carbon fiber-reinforced plastic material;
the engine support portion is provided in each of the left wall portion and the right wall portion;
the left arm is swingably supported by the left wall portion at two points; and
the right arm is swingably supported by the right wall portion at two points.

* * * * *